(12) United States Patent
Samuel et al.

(10) Patent No.: US 8,557,334 B2
(45) Date of Patent: Oct. 15, 2013

(54) SILICONE HYDROGEL LENS WITH A COVALENTLY ATTACHED COATING

(75) Inventors: Newton T. Samuel, Suwanee, GA (US); Daqing Wu, Suwanee, GA (US)

(73) Assignee: Novartis AG, Basel (CH)

( * ) Notice: Subject to any disclaimer, the term of this patent is extended or adjusted under 35 U.S.C. 154(b) by 399 days.

(21) Appl. No.: 12/960,617

(22) Filed: Dec. 6, 2010

(65) Prior Publication Data

US 2011/0134387 A1   Jun. 9, 2011

Related U.S. Application Data

(60) Provisional application No. 61/267,469, filed on Dec. 8, 2009.

(51) Int. Cl.
| | | |
|---|---|---|
| B05D 5/06 | (2006.01) | |
| B05D 1/18 | (2006.01) | |
| B65B 33/00 | (2006.01) | |
| G02C 7/00 | (2006.01) | |
| G02C 7/02 | (2006.01) | |
| G02C 7/04 | (2006.01) | |

(52) U.S. Cl.
USPC .... 427/164; 427/155; 427/430.1; 351/159.33

(58) Field of Classification Search
USPC .......... 427/155, 164, 371, 430.1; 351/159.33
See application file for complete search history.

(56) References Cited

U.S. PATENT DOCUMENTS

| | | | |
|---|---|---|---|
| 3,488,327 A | 1/1970 | Kollinsky | |
| 3,583,950 A | 6/1971 | Kollinsky | |
| 3,598,790 A | 8/1971 | Kollinsky | |
| 4,136,250 A | 1/1979 | Mueller | |
| 4,153,641 A | 5/1979 | Deichert | |
| 4,182,822 A | 1/1980 | Chang | |
| 4,189,546 A | 2/1980 | Deichert | |
| 4,254,248 A | 3/1981 | Friends | |
| 4,259,467 A | 3/1981 | Keogh | |
| 4,260,725 A | 4/1981 | Keogh | |
| 4,261,875 A | 4/1981 | LeBoeuf | |
| 4,276,402 A | 6/1981 | Chromecek | |
| 4,327,203 A | 4/1982 | Deichert | |
| 4,341,889 A | 7/1982 | Deichert | |
| 4,343,927 A | 8/1982 | Chang | |
| 4,355,147 A | 10/1982 | Deichert | |
| 4,444,711 A | 4/1984 | Schad | |
| 4,460,534 A | 7/1984 | Boehm | |
| 4,486,577 A | 12/1984 | Mueller | |
| 4,543,398 A | 9/1985 | Bany | |
| 4,605,712 A | 8/1986 | Mueller | |
| 4,661,575 A | 4/1987 | Tom | |
| 4,684,538 A | 8/1987 | Klemarczyk | |
| 4,695,608 A | 9/1987 | Engler | |
| 4,703,097 A | 10/1987 | Wingler | |
| 4,833,218 A | 5/1989 | Lee | |
| 4,837,289 A | 6/1989 | Mueller | |
| 4,910,277 A * | 3/1990 | Bambury et al. ............. 526/260 |
| 4,954,586 A | 9/1990 | Toyoshima | |
| 4,954,587 A | 9/1990 | Mueller | |
| 5,010,141 A | 4/1991 | Mueller | |
| 5,034,461 A | 7/1991 | Lai | |
| 5,039,761 A | 8/1991 | Ono | |
| 5,070,170 A | 12/1991 | Robertson | |
| 5,079,319 A | 1/1992 | Mueller | |
| 5,262,484 A | 11/1993 | Coleman | |
| 5,292,514 A | 3/1994 | Capecchi | |
| 5,346,946 A | 9/1994 | Yokoyama | |
| 5,352,714 A | 10/1994 | Lai | |
| 5,358,995 A | 10/1994 | Lai | |
| 5,387,632 A | 2/1995 | Lai | |
| 5,408,002 A | 4/1995 | Coleman | |
| 5,416,132 A | 5/1995 | Yokoyama | |
| 5,451,617 A | 9/1995 | Lai | |
| 5,476,665 A | 12/1995 | Dennison | |
| 5,486,579 A | 1/1996 | Lai | |
| 5,527,925 A | 6/1996 | Chabrecek | |
| 5,583,163 A | 12/1996 | Müller | |
| 5,612,389 A | 3/1997 | Chabrecek | |
| 5,612,391 A | 3/1997 | Chabrecek | |
| 5,621,018 A | 4/1997 | Chabrecek | |
| 5,731,087 A | 3/1998 | Fan | |
| 5,760,100 A | 6/1998 | Nicolson | |
| 5,843,346 A | 12/1998 | Morrill | |
| 5,849,811 A | 12/1998 | Nicolson | |
| 5,871,675 A * | 2/1999 | Muller et al. ................ 264/1.38 |

(Continued)

FOREIGN PATENT DOCUMENTS

WO        03059967 A1      7/2003

OTHER PUBLICATIONS

PCT International Search Report dated Feb. 8, 2011, International Application No. PCT/US10/59022, International Filing Date Dec. 6, 2010.

PCT Written Opinion of the International Searching Authority dated Feb. 8, 2011, International Application No. PCT/US10/59022, International Filing Date Dec. 6, 2010.

Cullen, Sean P., Mandel, Ian C., and Gopalan, Padma, Surface-Anchored Poly(2-vinyl-4,4-dimethyl azlactone) Brushes as Templates for Enzyme Immobilization, Langmuir, 2008, pp. 13701-13709, ACS Publications, American Chemical Society, 1155 Sixteenth Street N.W., Washington, DC 20036.

*Primary Examiner* — Katherine A Bareford
*Assistant Examiner* — James M Mellott
(74) *Attorney, Agent, or Firm* — Jian Zhou

(57) ABSTRACT

The invention provides a cost-effective method for making a silicone hydrogel contact lens having a hydrophilic coating thereon that is covalently attached to the lens and has a good hydrophilicity, intactness and durability. The invention also provides a silicone hydrogel contact lenses having a hydrophilic coating consisting of a prime coating covalently attached to the contact lens and a top coating covalently attached to the prime coating.

20 Claims, No Drawings

(56) References Cited

U.S. PATENT DOCUMENTS

| | | | |
|---|---|---|---|
| 5,894,002 A | 4/1999 | Boneberger | |
| 5,932,674 A * | 8/1999 | Muller | 526/266 |
| 5,962,548 A | 10/1999 | Vanderlaan | |
| 5,981,675 A | 11/1999 | Valint, Jr. | |
| 6,039,913 A | 3/2000 | Hirt | |
| 6,063,484 A | 5/2000 | Exsted | |
| 6,099,122 A | 8/2000 | Chabrecek | |
| 6,207,796 B1 | 3/2001 | Dairoku | |
| 6,265,509 B1 * | 7/2001 | Muller | 526/266 |
| 6,303,687 B1 | 10/2001 | Müller | |
| 6,367,929 B1 | 4/2002 | Maiden | |
| 6,436,481 B1 | 8/2002 | Chabrecek | |
| 6,440,571 B1 * | 8/2002 | Valint et al. | 428/447 |
| 6,447,920 B1 | 9/2002 | Chabrecek | |
| 6,451,871 B1 | 9/2002 | Winterton | |
| 6,465,056 B1 | 10/2002 | Chabrecek | |
| 6,521,352 B1 | 2/2003 | Chabrecek | |
| 6,582,754 B1 | 6/2003 | Pasic | |
| 6,586,038 B1 | 7/2003 | Chabrecek | |
| 6,599,559 B1 | 7/2003 | McGee | |
| 6,623,747 B1 | 9/2003 | Chatelier | |
| 6,623,786 B2 | 9/2003 | Baron | |
| 6,627,124 B1 | 9/2003 | Herbrechtsmeier | |
| 6,630,243 B2 | 10/2003 | Valint, Jr. | |
| 6,719,929 B2 | 4/2004 | Winterton | |
| 6,730,366 B2 | 5/2004 | Lohmann | |
| 6,734,321 B2 | 5/2004 | Chabrecek | |
| 6,762,264 B2 | 7/2004 | Künzler | |
| 6,793,973 B2 | 9/2004 | Winterton | |
| 6,800,225 B1 | 10/2004 | Hagmann | |
| 6,822,016 B2 | 11/2004 | McCabe | |
| 6,835,410 B2 | 12/2004 | Chabrecek | |
| 6,858,310 B2 | 2/2005 | McGee | |
| 6,878,399 B2 | 4/2005 | Chabrecek | |
| 6,884,457 B2 | 4/2005 | Gilliard | |
| 6,896,926 B2 | 5/2005 | Qiu | |
| 6,923,978 B2 | 8/2005 | Chatelier | |
| 6,926,965 B2 | 8/2005 | Qiu | |
| 6,940,580 B2 | 9/2005 | Winterton | |
| 7,052,131 B2 | 5/2006 | McCabe | |
| 7,091,283 B2 | 8/2006 | Müller | |
| 7,238,750 B2 | 7/2007 | Müller | |
| 7,249,848 B2 | 7/2007 | Laredo | |
| 7,268,189 B2 | 9/2007 | Müller | |
| 7,297,725 B2 | 11/2007 | Winterton | |
| 7,384,590 B2 | 6/2008 | Kelly | |
| 7,387,759 B2 | 6/2008 | Kelly | |
| 7,429,558 B2 | 9/2008 | Batchelor | |
| 7,521,519 B1 | 4/2009 | Hirt | |
| 7,556,858 B2 | 7/2009 | Rasmussen | |
| 2001/0019762 A1 | 9/2001 | Nazarova | |
| 2003/0143335 A1 * | 7/2003 | Qiu et al. | 427/430.1 |
| 2005/0060812 A1 | 3/2005 | Batchelor | |
| 2007/0229758 A1 | 10/2007 | Matsuzawa | |
| 2008/0015315 A1 | 1/2008 | Chang | |
| 2008/0100796 A1 * | 5/2008 | Pruitt et al. | 351/160 H |
| 2008/0143003 A1 | 6/2008 | Phelan | |
| 2008/0143958 A1 | 6/2008 | Medina | |
| 2008/0152800 A1 | 6/2008 | Bothe | |
| 2008/0174035 A1 | 7/2008 | Winterton | |
| 2008/0226922 A1 * | 9/2008 | Ferreiro et al. | 428/413 |
| 2008/0231798 A1 | 9/2008 | Zhou | |
| 2008/0234457 A1 | 9/2008 | Zhou | |
| 2009/0111942 A1 | 4/2009 | Lang | |
| 2010/0296049 A1 | 11/2010 | Justynska | |
| 2010/0298446 A1 | 11/2010 | Chang | |
| 2012/0112373 A1 * | 5/2012 | Holland et al. | 264/1.36 |
| 2012/0177839 A1 * | 7/2012 | Tucker et al. | 427/514 |

* cited by examiner

SILICONE HYDROGEL LENS WITH A COVALENTLY ATTACHED COATING

This application claims the benefit under 35 U.S.C. §119 (e) of U.S. provisional application Ser. No. 61/267,469 filed Dec. 8, 2009, herein incorporated by reference in its entirety.

The present invention generally relates to a cost-effective and time-efficient method for applying a coating of hydrophilic polymers onto a silicone hydrogel contact lens to improve its hydrophilicity and lubricity. In addition, the present invention provides a silicone hydrogel contact lens having a hydrophilic coating with a good intactness and durability.

BACKGROUND

In recent years, soft silicone hydrogel contact lenses are increasingly becoming popular because of their high oxygen permeability and comfort. However, a silicone hydrogel material typically has a surface or at least some areas of its surface which is hydrophobic (non-wettable). Hydrophobic surface or surface areas will up take lipids or proteins from the ocular environment and may adhere to the eye. Thus, a silicone hydrogel contact lens will generally require a surface modification.

A known approach for modifying the hydrophilicity of a relatively hydrophobic contact lens material is through the use of a plasma treatment, for example, commercial lenses such as Focus NIGHT & DAY™ and O2OPTIX™ (CIBA VISION), and PUREVISION™ (Bausch & Lomb). Advantages of a plasma coating is its durability, relatively high hydrophilicity (or good wettability), and low susceptibility to lipid and protein deposition and adsorption. But, plasma treatment of silicone hydrogel contact lenses may not be cost effective, because the preformed contact lenses must be dried before plasma treatment and because of relative high capital investment associated with plasma treatment equipments.

Another approach for modifying the surface hydrophilicity of a silicone hydrogel contact lens is the incorporation of wetting agents (hydrophilic polymers) into a lens formulation for making the silicone hydrogel contact lens as proposed in U.S. Pat. Nos. 6,367,929, 6,822,016, 7,052,131, and 7,249,848. This method may not require additional posterior processes for modifying the surface hydrophilicity of the lens after cast-molding of silicone hydrogel contact lenses. However, wetting agents may not be compatible with the silicone components in the lens formulation and the incompatibility may impart haziness to the resultant lenses. Further, such surface treatment may be susceptible to lipid deposition and adsorption. In addition, such surface treatment may not provide a durable surface for extended wear purpose.

A further approach for modifying the hydrophilicity of a relatively hydrophobic contact lens material is a layer-by-layer (LbL) polyionic material deposition technique (see for example, U.S. Pat. Nos. 6,451,871, 6,717,929, 6,793,973, 6,884,457, 6,896,926, 6,926,965, 6,940,580, and 7,297,725, and U.S. Patent Application Publication Nos. US 200710229758A1, US 200810174035A1, and US 2008/0152800A1). This technique can provide a cost effective process for rendering a silicone hydrogel material wettable. However, such LbL coating may not be suitable for extended wear purpose, because it may be less durable than a plasma coating and may not be compatible with the preservatives in some lens care solutions in the market.

A still further approach for modifying the hydrophilicity of a relatively hydrophobic contact lens material is to attach hydrophilic polymers onto contact lenses according to various mechanism (see for example, U.S. Pat. No. 6,099,122, U.S. Pat. No. 6,436,481, U.S. Pat. No. 6,440,571, U.S. Pat. No. 6,447,920, U.S. Pat. No. 6,465,056, U.S. Pat. No. 6,521,352, U.S. Pat. No. 6,586,038, U.S. Pat. No. 6,623,747, U.S. Pat. No. 6,730,366, U.S. Pat. No. 6,734,321, U.S. Pat. No. 6,835,410, U.S. Pat. No. 6,878,399, and U.S. Pat. No. 6,923,978). For example, U.S. Pat. No. 6,436,481 discloses the use of plasma-induced graft polymerization to form a primary coating with reactive groups including azlactone, amine, hydroxyl, carboxylic. A secondary coating, composed of hydrophilic polymers or materials, is attached to the primary coating to enhance surface hydrophilicity and wettability. Although those techniques can be use in rendering a silicone hydrogel material wettable, they may not be cost-effective and/or time-efficient for implementation in a mass production environment, because they typically require relatively long time and/or involve laborious, multiple steps to obtain a polymeric hydrophilic coating.

In another example, U.S. Pat. No. 6,440,571 discloses a method for modifying the surface of a medical device (including a contact lens) to increase its biocompability or hydrophilicity by coating the device with a hydrophilic polymer by means of reaction between reactive functionalities on the hydrophilic polymer which functionalities are complementary to reactive functionalities on or near surface of the medical device. U.S. Pat. No. 6,440,571 discloses that the functionalities on or near the surface of the contact lens can be azlactone groups which are introduced by copolymerizing a lens formulation including an azlactone-containing vinylic monomer, even though no actual example is provided. However, it fails to disclose and recognize that the amount of azlactone-containing vinylic monomer present in the lens formulation and subsequently in the resultant lenses has dual effects on the resultant lenses, the extent of swelling of the contact lenses upon the ring-opening hydrolysis of the azlactone groups and the efficiency in covalently attaching a hydrophilic polymer coating. The higher the amount of azlactone-containing vinylic monomer present in the lens formulation, the larger the lens swelling and the more wettable the surface of the lens (due to the high efficiency of the covalent attachment of a coating of hydrophilic polymer onto the lens surface). In contrast, the lower the amount of azlactone-containing vinylic monomer present in the lens formulation, the smaller the lens swelling and the less wettable of the surface of the lens (due to the low efficiency of the covalent attachment of a coating of hydrophilic polymer onto the lens surface). As such, the method disclosed in U.S. Pat. No. 6,440,571 may not be useful for modifying the surface wettability of silicone hydrogel contact lenses because it cannot provide a silicone hydrogel with a wettable surface while not causing the lens swelling significantly.

In view of above, there is a need for a method of producing silicone hydrogel contact lenses with wettable and durable coating (surface) in a cost-effective and time-efficient manner.

SUMMARY OF THE INVENTION

The invention, in one aspect, provides a method of applying a hydrophilic coating onto a silicone hydrogel contact lens, the method of invention comprising: (a) polymerizing, in a mold, a polymerizable (or lens forming) composition comprising at least one silicone-containing vinylic monomer or macromer and an azlactone-containing vinylic monomer or macromer, thereby forming a silicone hydrogel contact lens having azlactone moieties covalently attached onto the polymer matrix of the contact lens, wherein the azlactone-containing vinylic monomer or macromer is present in an amount of about 0.5% to about 5.0% by weight in the lens formulation; (b) contacting the contact lens with a solution of an anchoring hydrophilic polymer having pendant primary or secondary amino groups or thiol groups for a period of time sufficient to form a prime coating on the contact lens, wherein the prime coating comprises a layer of the anchoring hydrophilic polymer covalently attached to the surface of the contact lens through one or more covalent linkages each formed between one azlactone moiety at or near the surface of the contact lens and one of the pendant primary or secondary amino groups or thiol groups of the anchoring hydrophilic polymer; (c) applying a top coating on top of the prime coating to form the hydrophilic coating with an increased surface hydrophilicity and/or durability with respect to the prime coating, wherein the top coating comprises at least one layer of a carboxylic acid-containing hydrophilic polymer and/or at least one layer of an azetidinium-containing polymer, wherein the layer of the carboxylic acid-containing hydrophilic polymer is formed by contacting the contact lens having the prime coating thereon with a solution of the carboxylic acid-containing hydrophilic polymer, wherein the layer of the azetidinium-containing polymer is formed by contacting the contact lens having the prime coating thereon and optionally the layer of the carboxylic acid-containing hydrophilic polymer with a solution of the azetidinium-containing polymer, wherein the layer of the carboxylic acid-containing hydrophilic polymer and/or the layer of the azetidinium-containing polymer is chemically and/or physically bound to the layer of the anchoring hydrophilic polymer.

In another aspect, the invention provides a silicone hydrogel contact lens. The contact lens of the invention comprises a core silicone hydrogel material and a hydrophilic coating, wherein the core silicone hydrogel material comprises azlactone moieties directly derived from an azlactone-containing vinylic monomer or macromer contained in a lens forming material for making the core silicone hydrogel material, wherein the hydrophilic coating comprises a prime coating and a top coating, wherein the prime coating is a layer of an anchoring hydrophilic polymer having primary or secondary groups or thiol groups and is covalently attached directly to the core silicone hydrogel material through covalent linkages each formed between one azlactone moiety at or near the surface of the contact lens and one primary or secondary amino group or thiol group, wherein the top coating comprises at least one layer of a carboxylic acid-containing hydrophilic polymer and/or at least one layer of an azetidinium-containing polymer, wherein the layer of the carboxylic acid-containing hydrophilic polymer and/or the layer of the azetidinium-containing polymer is chemically and/or physically bound to the layer of the anchoring hydrophilic polymer, wherein the silicone hydrogel contact lens has an oxygen permeability of at least 40 barrers, a surface wettability characterized by a water contact angle of about 100 degrees or less, and a good coating durability characterized by surviving a digital rubbing test.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "silicone hydrogel" refers to a silicone-containing polymeric material which can absorb at least 10 percent by weight of water when it is fully hydrated and is obtained by copolymerization of a polymerizable composition comprising at least one silicone-containing vinylic monomer or at least one silicone-containing macromer or at least one crosslinkable silicone-containing prepolymer.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylenically unsaturated group" is employed herein in a broad sense and is intended to encompass any groups containing at least one >C=C< group. Exemplary ethylenically unsaturated groups include without limitation

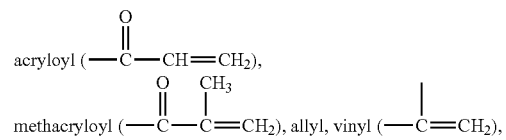

styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" or "prepolymer" refers to a medium and high molecular weight compound or polymer that contains functional groups capable of undergoing further polymerizing and/or crosslinking reactions. Medium and high molecular weight typically means average molecular weights greater than 700 Daltons. Preferably, a macromer contains ethylenically unsaturated groups and can be polymerized actinically or thermally.

A "polymer" means a material formed by polymerizing/crosslinking one or more monomers or macromers.

An "initiator" is intended to describe a chemical that initiates free radical reaction and can be a photoinitiator or thermal initiator.

A "photoinitiator" refers to a chemical that initiates radical crosslinking/polymerizing reaction by the use of light.

A "thermal initiator" refers to a chemical that initiates radical crosslinking/polymerizing reaction by the use of heat energy.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. Nos. 6,800,225 (FIGS. 1-11), and 6,627,124 (FIGS. 1-9), 7,384,590 (FIGS. 1-6), and 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV/visible radiation) limits radiation (e.g., UV/visible radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is a radiation energy, especially UV/visible radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surface of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

The term "fluid" as used herein indicates that a material is capable of flowing like a liquid.

A "water contact angle" refers to a water contact angle (measured by Sessile Drop method), which is obtained by averaging measurements of at least 3 individual contact lenses.

A "UV absorber" refers to a compound comprising a Ultraviolet absorbing ("UV-absorbing") moiety capable of absorbing or screening out UV radiation in the region of 200 to 400 nm.

As used herein, "surviving a digital rubbing test" or surviving a durability test" in reference to a coating on a contact lens means that after digitally rubbing the lens according to a procedure described in Example 1, water contact angle on the digitally rubbed lens is still about 100 degrees or less, preferably about 90 degrees or less, more preferably about 80 degrees or less, most preferably about 70 degrees or less.

The intrinsic "oxygen permeability", Dk, of a material is the rate at which oxygen will pass through a material. In accordance with the invention, the term "oxygen permeability (Dk)" in reference to a material or a contact lens means an apparent oxygen permeability which is measured with a sample (film or lens) of 90 or 100 microns in average thickness over the area being measured according to a coulometric method described in Examples. Oxygen permeability is conventionally expressed in units of barrers, where "barrer" is defined as $[(cm^3 \text{ oxygen})(mm)/(cm^2)(sec)(mm\ Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm\ Hg)] \times 10^{-9}$.

The "ion permeability" through a lens correlates with the Ionoflux Diffusion Coefficient. The Ionoflux Diffusion Coefficient, D (in units of [mm$^2$/min]), is determined by applying Fick's law as follows:

$$D = -n'/(A \times dc/dx)$$

where n'=rate of ion transport [mol/min]; A=area of lens exposed [mm$^2$]; dc=concentration difference [mol/L]; dx=thickness of lens [mm].

The invention is generally directed to a cost-effective and time-efficient method for making silicone hydrogel contact lenses with durable hydrophilic coatings. The durable hydrophilic coating on a contact lens of the invention has a "multilayered structure" comprising: a layer of an anchoring hydrophilic polymer which is covalently attached onto the surface of the contact lens through one or more covalent linkages each formed between one azlactone moiety at or near the surface of the contact lens and one primary or secondary group of the anchoring hydrophilic polymer; at least one layer of a carboxylic acid-containing hydrophilic polymer and/or at least one layer of an azetidinium-containing polymer, wherein the layer of the carboxylic acid-containing hydrophilic polymer and/or the layer of the azetidinium-containing polymer is chemically and/or physically bound to the layer of the anchoring hydrophilic polymer.

The term "layered structure" is employed herein in a broad sense and is intended to encompass, a coating structure formed by applying successively one layer after another of coating materials. It should be understood that the layers of the coating materials may be intertwined with each other in the coating.

It is found here that although azlactone groups can be used as anchoring sites in a contact lens for covalently attaching a layer of a hydrophilic polymer, their presence in the lens has an undesirable side effect, lens swelling, because of ring-opening hydrolysis of azlactone during autoclave of the lens. To minimize such side effect, the amount of azlactone groups in a lens must be minimized. However, the minimization of the amount of azlactone groups in the lens can greatly reduce the number of azlactone groups accessible by the hydrophilic polymer at or near the surface of a resultant contact lens so that a resultant coating will have unacceptable hydrophilicity and/or unacceptable durability. The present invention solves this problem by combination of a prime coating covalently attached to the lens surface through azlactone groups and a top coating bound to the prime coating.

This invention is partly based on the unexpected discoveries that a prime coating required for forming a durable hydrophilic coating can be formed by using an amount of an azlactone-containing vinylic monomer sufficient low to cause insignificant lens swelling but sufficient high to provide enough anchoring sites at or near the surface of the lens and by using a linear or (preferably) branched hydrophilic polymer having pendant primary or secondary amino groups, and that a top coating can be formed by sequentially binding one or more layers of hydrophilic polymers onto the prime coating.

The present invention can provide the following advantages. First, the whole process is based on wet chemistry and thereby no drying of contact lenses is required. Second, the coating process can be accomplished, e.g., by dipping contact lenses sequentially in a series of baths of coating solutions each for a period of less than about 5 minutes. Such process can be easily implemented in a fully-automated, mass-production environment. Third, a coating obtained according to the method of the invention is durable and hydrophilic. Fourth, a coating obtained according to the method of the invention can have minimal or no uptake of polyhexamethylene biguanide (PHMB) which is an antimicrobial agent widely used in lens care solutions. Higher concentrations of biguanides may cause corneal inflammation and other eye tissue irritation. It would be desirable that a coating on a contact lens would have minimal or no PHMB uptake.

The invention, in one aspect, provides a method of applying a hydrophilic coating onto a silicone hydrogel contact lens, the method of invention comprising: (a) polymerizing, in a mold, a polymerizable (or lens forming) composition comprising at least one silicone-containing vinylic monomer or macromer and an azlactone-containing vinylic monomer or macromer, thereby forming a silicone hydrogel contact lens having azlactone moieties covalently attached onto the polymer matrix of the contact lens, wherein the azlactone-containing vinylic monomer or macromer is present in an amount of about 0.5% to about 5.0% by weight in the lens formulation; (b) contacting the contact lens with a solution of an anchoring hydrophilic polymer having pendant primary or secondary amino groups or thiol groups for a period of time sufficient to form a prime coating on the contact lens, wherein the prime coating comprises a layer of the anchoring hydrophilic polymer covalently attached to the surface of the contact lens through one or more covalent linkages each formed between one azlactone moiety at or near the surface of the contact lens and one of the pendant primary or secondary amino groups or thiol groups of the anchoring hydrophilic polymer; (c) applying a top coating on top of the prime coating to form the hydrophilic coating with an increased surface hydrophilicity and/or durability with respect to the prime coating, wherein the top coating comprises at least one layer of a carboxylic acid-containing hydrophilic polymer and/or at least one layer of an azetidinium-containing polymer, wherein the layer of the carboxylic acid-containing hydrophilic polymer is formed by contacting the contact lens having the prime coating thereon with a solution of the carboxylic acid-containing hydrophilic polymer, wherein the layer of the azetidinium-containing polymer is formed by contacting the contact lens having the prime coating thereon and optionally the layer of the carboxylic acid-containing hydrophilic polymer with a solution of the azetidinium-containing polymer, wherein the layer of the carboxylic acid-containing hydrophilic polymer and/or the layer of the azetidinium-containing polymer is chemically and/or physically bound to the layer of the anchoring hydrophilic polymer.

Any suitable silicone-containing vinylic monomers or macromers can be used in the invention. Examples of preferred silicone-containing vinylic monomers include without limitation N-[tris(trimethylsiloxy)silylpropyl]-(meth)acrylamide, N-[tris(dimethylpropylsiloxy)-silylpropyl]-(meth) acrylamide, N-[tris(dimethylphenylsiloxy)silylpropyl] (meth)acrylamide, N-[tris(dimethylethylsiloxy)silylpropyl] (meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl)acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy) methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl) propyloxy)propyl)acrylamide; N,N-bis[2-hydroxy-3-(3-(tris (trimethylsilyloxy)silyl)propyloxy)propyl]-2-methyl acrylamide; N,N-bis[2-hydroxy-3-(3-(tris(trimethylsilyloxy)silyl) propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl] acrylamide; N,N-bis[2-hydroxy-3-(3-(t-butyldimethylsilyl) propyloxy)propyl]-2-methyl acrylamide; N,N-bis[2-hydroxy-3-(3-(t-butyldimethylsilyl)propyloxy)propyl] acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy) methylsilane, N-2-methacryloxyethyl-O-(methyl-bis-trimethylsiloxy-3-propyl)silyl carbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth)acrylamide monomers of formula (1) are N-[tris(trimethylsiloxy)silylpropyl]acrylamide, TRIS, N-[2-hydroxy-3-(3-(t-butyldimethylsilyl)propyloxy)propyl]acrylamide.

A class of preferred silicone-containing vinylic monomers or macromers is polysiloxane-containing vinylic monomers or macromers. A "polysiloxane-containing vinylic monomer or macromer" refers to a vinylic monomer or macromer containing at least one ethylenically unsaturated group and a divalent radical of

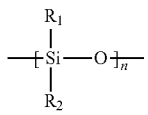

in which $R_1$ and $R_2$ are independently a monovalent $C_1$-$C_{10}$ alkyl, a monovalent $C_1$-$C_{10}$ aminoalkyl, a monovalent of $C_1$-$C_{10}$ hydroxyalkyl, $C_1$-$C_{10}$ ether, $C_1$-$C_{10}$ fluoroalkyl, $C_1$-$C_{10}$ fluoroether or $C_6$-$C_{18}$ aryl radical, -alk-(OCH$_2$CH$_2$)$_m$—OR$_3$, in which alk is $C_1$-$C_6$ alkylene divalent radical, $R_3$ is hydrogen or $C_1$-$C_6$ alkyl, and m is an integer of from 1 to 10; n is an integer of 3 or higher. Examples of such vinylic monomers or macromers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; polysiloxanylalkyl (meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties). Di and triblock macromers consisting of polydimethylsiloxane and polyalkyleneoxides could also be of utility. For example one might use methacrylate end capped polyethyleneoxide-block-polydimethylsiloxane-block-polyethyleneoxide to enhance oxygen permeability. Suitable monofunctional hydroxyl-functionalized siloxane-containing vinylic monomers/macromers and suitable multifunctional hydroxyl-functionalized siloxane-containing vinylic monomers/macromers are commercially available from Gelest, Inc, Morrisville, Pa.

Another class of preferred silicone-containing macromers are silicon-containing prepolymers comprising hydrophilic segments and hydrohpbobic segments. Any suitable of silicone-containing prepolymers with hydrophilic segments and hydrohpbobic segments can be used in the invention. Examples of such silicone-containing prepolymers include those described in commonly-owned U.S. Pat. Nos. 6,039,913, 7,091,283, 7,268,189 and 7,238,750, 7,521,519; commonly-owned US patent application publication Nos. US 2008-0015315 A1, US 2008-0143958 A1, US 2008-0143003 A1, US 2008-0234457 A1, US 2008-0231798 A1, and commonly-owned U.S. patent application Nos. 61/180,449 and 61/180,453; all of which are incorporated herein by references in their entireties.

In accordance with the invention, an azlactone-containing vinylic monomer or macromer means that a vinylic monomer or macromer comprises at least one azlactone moiety (or group) which is a mono-valent radical of

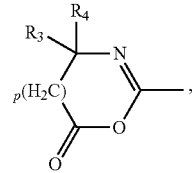

in which p is 0 or 1; $R_3$ and $R_4$ independently can be an alkyl group having 1 to 14 carbon atoms, a cycloalkyl group having 3 to 14 carbon atoms, an aryl group having 5 to 12 ring atoms, an arenyl group having 6 to 26 carbon and 0 to 3 sulfur, nitrogen and/or oxygen atoms, or $R_3$ and $R_4$ taken together with the carbon to which they are joined can form a carbocyclic ring containing 4 to 12 ring atoms.

Any suitable azlactone-containing vinylic monomers can be used in the invention. Examples of azlactone-containing vinylic monomers include: 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one. The preferred azlactone-containing vinylic monomers include 2-vinyl-4,4-dimethyl-1,3-oxazolin-5-one (VDMO) and 2-isopropenyl-4,4-dimethyl-1,3-oxazolin-5-one (IPDMO).

In accordance with the invention, the azlactone-containing vinylic monomer or macromer is present in an amount of from about 0.5% to about 5.0% by weight, preferably from about 0.55% to about 3.5% by weight, more preferably from about 0.6% to about 2.5%, even more preferably from about 0.8% to about 1.8% by weight, most preferably from about 1.0% to about 1.5% by weight based on the lens formulation (i.e., polymerizable composition).

A polymerizable composition can also comprise a hydrophilic vinylic monomer. Nearly any hydrophilic vinylic monomer can be used in the invention. Suitable hydrophilic vinylic monomers are, without this being an exhaustive list, hydroxyl-substituted lower alkyl ($C_1$ to $C_6$) acrylates and methacrylates, hydroxyl-substituted lower alkyl vinyl ethers, $C_1$ to $C_6$ alkylacrylamide, $C_1$ to $C_6$ alkylmethacrylamide, di-($C_1$-$C_6$ alkyl)acrylamide, di-($C_1$-$C_6$ alkyl)methacrylamide, N-vinyl pyrrole, N-vinyl-2-pyrrolidone, 2-vinyloxazoline, 2-vinyl-4,4'-dialkyloxazolin-5-one, 2- and 4-vinylpyridine, olefinically unsaturated carboxylic acids having a total of 3 to 6 carbon atoms, amino(lower alkyl)-(where the term "amino" also includes quaternary ammonium), mono(lower alkylamino)(lower alkyl) and di(lower alkylamino)(lower alkyl)acrylates and methacrylates, allyl alcohol, N-vinyl alkylamide, N-vinyl-N-alkylamide, and the like.

Examples of preferred hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol (meth)acrylate having a weight average molecular weight of up to 1500, methacrylic acid, N-vinyl formamide, N-vinyl acetamide, N-vinyl isopropylamide, N-vinyl-N-methyl acetamide, allyl alcohol, N-vinyl caprolactam, and mixtures thereof.

A polymerizable composition for making silicone hydrogel lenses can also comprises a hydrophobic monomer. By incorporating a certain amount of hydrophobic vinylic monomer in a polymerizable fluid composition, the mechanical properties (e.g., modulus of elasticity) of the resultant polymer may be improved. Nearly any hydrophobic vinylic monomer can be used. Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

A polymerizable composition for making silicone hydrogel lenses can also comprises one or more crosslinking agents (i.e., compounds with two or more acryl groups or three or more thiol or ene-containing groups and with molecular weight less than 700 Daltons). Examples of preferred cross-linking agents include without limitation tetraethyleneglycol diacrylate, triethyleneglycol diacrylate, ethyleneglycol diacylate, diethyleneglycol diacrylate, tetraethyleneglycol dimethacrylate, triethyleneglycol dimethacrylate, ethyleneglycol dimethacylate, diethyleneglycol dimethacrylate, trimethylopropane trimethacrylate, pentaerythritol tetramethacrylate, bisphenol A dimethacrylate, vinyl methacrylate, ethylenediamine dimethyacrylamide, ethylenediamine diacrylamide, glycerol dimethacrylate, triallyl isocyanurate, triallyl cyanurate, allylmethacrylate, allylmethacrylate, 1,3-bis(methacrylamidopropyl)-1,1,3,3-tetrakis(trimethylsiloxy)disiloxane, N,N'-methylenebisacrylamide, N,N'-methylenebismethacrylamide, N,N'-ethylenebisacrylamide, N,N'-ethylenebismethacrylamide, 1,3-bis(N-methacrylamidopropyl)-1,1,3,3-tetrakis-(trimethylsiloxy)disiloxane, 1,3-bis(methacrylamidobutyl)-1,1,3,3-tetrakis(trimethylsiloxy)-disiloxane, 1,3-bis(acrylamidopropyl)-1,1,3,3-tetrakis(trimethylsiloxy)disiloxane, 1,3-bis (methacryloxyethylureidopropyl)-1,1,3,3-tetrakis (trimethylsiloxy)disiloxane, and combinations thereof. A preferred cross-linking agent is tetra(ethyleneglycol) diacrylate, tri(ethyleneglycol) diacrylate, ethyleneglycol diacrylate, di(ethyleneglycol) diacrylate, methylenebisacrylamide, triallyl isocyanurate, or triallyl cyanurate. The amount of a cross-linking agent used is expressed in the weight content with respect to the total polymer and is preferably in the range from about 0.05% to about 4%, and more preferably in the range from about 0.1% to about 2%.

It must be understood that a polymerizable composition for making silicone hydrogel lenses can also comprise various components, such as, for example, polymerization initiators (e.g., photoinitiator or thermal initiator), a visibility tinting agent (e.g., dyes, pigments, or mixtures thereof), a polymerizable UV-absorbing agent, a polymerizable latent UV-absorbing agent, antimicrobial agents (e.g., preferably silver nanoparticles), bioactive agent, leachable lubricants, and the like, as known to a person skilled in the art.

In a preferred embodiment, the polymerizable composition comprises a polymerizable UV-absorbing agent or a polymerizable latent UV-absorbing agent. By having a polymerizable UV-absorbing agent or a polymerizable latent UV-absorbing agent in the monomer mixture, silicone hydrogel lenses with UV-absorbing capability can be obtained. Such lenses may protect to some extent corneal from damages caused by ultraviolet ("UV") radiation.

Any suitable polymerizable UV-absorbing agents can be used in the invention. Preferably, a polymerizable UV-absorbing agent comprises a benzotriazole-moiety or a benzophenone-moiety. Examples of preferred polymerizable UV absorbers include without limitation 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butylphenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy-4-methacryloxy alkoxy benzophenone, allyl-2-hydroxybenzophenone, 2-hydroxy-4-methacryloxy benzophenone.

A polymerizable latent UV-absorbing agent can be prepared from a polymerizable UV-absorbing agent described above according to any known method known to a person skilled in the art. For example, a benzotriazole-moiety or a benzophenone-moiety can be reacted with a protected labile group to convert a UV-absorbing moiety into a latent UV-absorbing moiety.

For a benzotriazole-type of UV-absorbing agent, the hydroxyl radical of the phenol moiety in a benzotriazole moiety can be replaced with a protective labile group to render the agent essentially non-UV absorbing (i.e., the protective group essentially shifts the absorption properties of the compound so that the agent does not absorb as strongly in the 280 to 400 nm range). Examples of protective labile groups include without limitation acetyl radical, acetylalkylsilane, alkylether, and alkylester. These protective groups can be converted back to a hydroxyl radical according to any known method after the lens is cured, thus rendering the lens UV-absorbing. For example, removal of protective labile groups can be performed by soaking the cured lens in saturated bicarbonate solution and heating.

Similarly, at least one hydroxyl radical of the phenolic radical of a benzophenone moiety can be replaced with one of the aforementioned protective labile groups to form a latent UV-absorbing moiety. The latent UV-absorbing moiety can be converted to a UV-absorbing moiety by removing the protective labile group.

A polymerizable UV-absorbing agent or a polymerizable latent UV-absorbing agent is generally present in the polymerizable composition in an amount sufficient to render a contact lens, which is obtained from the curing of the polymerizable composition and is subjected to treatment to convert latent UV-absorbing moieties if applicable, absorbing at least about 80 percent of the UV light in the range of from about 280 nm to about 370 nm that impinges on the lens. A person skilled in the art will understand that the specific amount of UV-absorbing agent used in the polymerizable composition will depend on the molecular weight of the UV-absorbing agent and its extinction coefficient in the range from about 280 to about 370 nm. In accordance with the invention, the polymerizable composition comprises about 0.2% to about 5.0%, preferably about 0.5% to about 2.5%, by weight of a UV-absorbing agent.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Where the polymerizable composition comprises a polymerizable UV-absorbing agent, a benzoylphosphine oxide photoinitiator is preferably used as the photoinitiator in the invention. Preferred benzoylphosphine oxide photoinitiators include without limitation 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. It is understood that any photoinitiators other than benzoylphosphine oxide initiators can be used in the invention.

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups).

Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof.

The average molecular weight $M_w$ of the non-crosslinkable hydrophilic polymer is preferably from 5,000 to 500,000, more preferably from 10,000 to 300,000, even more preferably from 20,000 to 100,000.

In accordance with the invention, a polymerizable composition can be a solution or a melt at a temperature from about 20° C. to about 85° C. Preferably, a polymerizable composition is a solution of all desirable components in a suitable solvent, or a mixture of suitable solvents.

A polymerizable composition can be prepared by dissolving all of the desirable components in any suitable solvent known to a person skilled in the art, so long as the used solvent(s) would not react significantly with the azlactone-moiety of the azlactone-containing vinylic monomer or macromer. Example of preferred solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidinone, N,N-dimethylpropionamide, dimethyl formamide, dimethyl acetamide, dimethyl propionamide, N-methylpyrrolidinone, and mixtures thereof.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711 to Schad; 4,460,534 to Boehm et al.; 5,843,346 to Morrill; and 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a silicone hydrogel contact lens. Examples of preferred reusable molds are those disclosed in U.S. patent application Ser. No. 08/274,942 filed Jul. 14, 1994, 10/732,566 filed Dec. 10, 2003, 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, a prime coating is formed by contacting a molded silicone hydrogel contact lens having azlactone groups therein and/or thereon with a solution of an anchoring hydrophilic polymer having pendant primary or secondary amino groups or thiol groups. Contacting of the contact lens with a solution of an anchoring hydrophilic polymer can occur by dipping it into the coating solution or by spraying it with the coating solution. One contacting process involves solely dipping the contact lens in a bath of a solution of the anchoring hydrophilic polymer for a period of time or alternatively dipping the contact lens sequentially in a series of bath of solutions of the anchoring hydrophilic polymer for a fixed shorter time period for each bath. Another contacting process involves solely spray a solution of the anchoring hydrophilic polymer. However, a number of alternatives involve various combinations of spraying- and dipping-steps may be designed by a person having ordinary skill in the art.

The contacting time of a contact lens with a solution of the anchoring hydrophilic polymer may last up to about 10 minutes, preferably from about 5 to about 360 seconds, more preferably from about 5 to about 250 seconds, even more preferably from about 5 to 200 seconds.

In accordance with the invention, the anchoring hydrophilic polymer can be a linear or branched polymer or copolymer having pendant primary and/or secondary amino groups. Preferably, the anchoring hydrophilic polymer has pendant primary amino groups or thiol groups (—SH). Primary amino groups should have higher reactivity with azlactone groups than secondary amino groups do. It should be understood that hydrophilic polymers with pendant nucleophilic groups including hydroxyl groups can also be used in the invention for forming a prime coating on a silicone hydrogel contact lens having azlactone groups thereon and/or therein. However, reaction rates between hydroxyl groups and azlactone groups may be slow and catalyst may have to be used.

Any hydrophilic polymers having pendant primary and/or secondary amino groups can be used as an anchoring hydrophilic polymer for forming prime coatings on silicone hydrogel contact lenses. Examples of such hydrophilic polymers include without limitation homopolymers of amino-$C_1$ to $C_4$ alkyl (meth)acrylamide or amino-$C_1$ to $C_4$ alkyl (meth)acrylate, copolymers of amino-$C_1$ to $C_4$ alkyl (meth)acrylamide or amino-$C_1$ to $C_4$ alkyl (meth)acrylate with one or more hydrophilic vinylic monomers (e.g., any hydrophilic vinylic monomer described above), polyethyleneimine (PEI), polyallylamine hydrochloride (PAH) homo- or copolymer, a polyvinylamine homo- or copolymer, polyvinylalcohol with pendant primary and/or secondary amino groups. Preferably, the hydrophilic polymers for forming a prime coating of the invention are polyethyleneimine (PEI), polyallylamine hydrochloride (PAH) homo- or copolymer, a polyvinylamine homo- or copolymer, polyvinylalcohol with pendant primary or secondary amino groups.

A preferred polyvinylalcohol with pendant primary and/or secondary amino groups is a polyhydroxyl polymer which is a derivative of a poly(vinyl alcohol) and has from about 0.5% to about 80%, based on the number of hydroxyl groups in the poly(vinyl alcohol), of units of the formula I

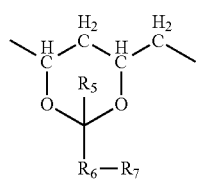

in which

R$_5$ is hydrogen, a C$_1$-C$_6$ alkyl group or a cycloalkyl group;
R$_6$ is alkylene having up to 12 carbon atoms, preferably up to 8 carbon atoms, and can be linear or branched; and
R$_7$ is a primary or secondary amino group of the formula N$^+$H$_2$(R')X$^-$, in which R' is hydrogen or a C$_1$-C$_4$ alkyl radical and X is a counterion, for example HSO$_4^-$, F$^-$, Cl$^-$, Br$^-$, I$^-$, CH$_3$COO$^-$, OH$^-$, BF$^-$, or H$_2$PO$_4^-$.

Suitable examples of R$_6$ include octylene, hexylene, pentylene, butylene, propylene, ethylene, methylene, 2-propylene, 2-butylene and 3-pentylene. R$_6$ preferably is methylene or butylene. The preferred radical R$_7$ is —NH$_2$, —NH—CH$_3$, —NH(C$_2$H$_5$), or combinations thereof.

Such polyhydroxyl polymers comprising units of formula I can be prepared in a manner known similar to those disclosed in U.S. Pat. Nos. 5,583,163 and 6,303,687 (herein incorporated by reference in their entireties). As an illustrative example, such a polyhydroxyl polymers can be prepared by reacting a polyvinyl alcohol with an acetal (e.g., aminobutyraldehyde-diethylacetal, or the like).

The molecular weight M$_w$ of the anchoring hydrophilic polymer for forming a prime coating of the invention is at least about 10,000 Daltons, preferably at least about 50,000 Daltons, more preferably at least about 100,000 Daltons, even more preferably from about 500,000 to 5,000,000 Daltons.

In accordance with the invention, before contacting with a solution of an anchoring hydrophilic polymer for forming a prime coating, a silicone hydrogel contact lens with azlactone groups therein and/or thereon can be subjected to extraction with an extraction solvent to remove unpolymerized components from the molded lens, as known by a person skilled in the art. Alternatively, extraction step can be carried out after a prime coating are formed on the silicone hydrogel contact lens.

A solution of an anchoring hydrophilic polymer can be prepared in dissolving the anchoring hydrophilic polymer in water, a mixture of water and an organic solvent miscible with water, an organic solvent, or a mixture of one or more organic solvent. Preferably, the anchoring hydrophilic polymer is dissolved in a mixture of water and one or more organic solvents, an organic solvent, or a mixture of one or more organic solvent. It is believed that a solvent system containing at least one organic solvent can swell a silicone hydrogel contact lens so that more azlactone groups in the silicone hydrogel contact lens may be more accessible to the pendant amino groups of the anchoring hydrophilic polymer and a prime coating may be more strongly attached onto the surface of the contact lens. Any organic solvents, including methanol, ethanol, and others described above, can be used in preparation of a solution of the anchoring hydrophilic polymer.

When a polymerizable composition for making silicone hydrogel contact lenses comprises from about 0.5% to about 5.0% by weight, in particular from about 0.6% to about 2.5% by weight of an azlactone-containing vinylic monomer or macromer, there is no sufficient amount of azlactone groups at or near the surface of a resultant contact lens for forming a durable and/or hydrophilic coating. Such deficiency can be solved by applying a top coating on top of the prime coating by contacting the contact lens with the prime coating thereon with one or more solutions of different coating materials so as to form the hydrophilic coating with an increased surface hydrophilicity compared to the prime coating. As used herein, an increased surface hydrophilicity related to the prime coating means that a contact lens with a prime coating and a top coating on top of the prime coating has a smaller water contact angle compared to a contact lens with the prime coating but without the top coating.

In one embodiment, the top coating comprises at least one layer of a carboxylic acid-containing hydrophilic polymer and is formed by contacting the contact lens with the prime coating thereon with a solution of a carboxylic acid-containing hydrophilic polymer. The carboxylic acid-containing hydrophilic polymer is capable of being bound to the layer of the anchoring hydrophilic polymer though electrostatic interactions and/or hydrogen bonds between the carboxylic acid groups of the second hydrophilic polymer and the amino groups of the anchoring hydrophilic polymer.

Preferably, the carboxylic acid-containing hydrophilic polymer contains further aldehyde groups. Where the carboxylic acid-containing hydrophilic polymer has aldehyde groups, it can binds strongly to the anchoring hydrophilic polymer through electrostatic interactions and hydrogen bonding as well as covalent linkages formed between the aldehyde groups and the amino groups of the anchoring hydrophilic polymer, so that the hydrophilic coating has a good durability characterized by surviving a digital rubbing test.

Examples of suitable carboxylic acid-containing hydrophilic polymers include, without limitation, carboxymethyl cellulose, hyaluronic acid aldehyde (i.e., a hyaluronic acid with aldehyde groups) (HAA), a linear polyacrylic acid (PAA), a branched polyacrylic acid, a poly-methacrylic acid (PMA), a polyacrylic acid or polymethacrylic acid copolymer, a maleic or fumaric acid copolymer. A branched polyacrylic acid in this context is to be understood as meaning a polyacrylic acid obtainable by polymerizing acrylic acid in the presence of suitable (minor) amounts of a di- or multivinyl compound. Examples of a branched polyacrylic acid include a Carbophil® or Carbopol® type from Goodrich Corp. Examples of a copolymer of (meth)acrylic acid include a copolymerization product of an acrylic or methacrylic acid with a vinyl monomer including, for example, acrylamide, N,N-dimethyl acrylamide or N-vinylpyrroli-done.

Most preferably, the carboxylic acid-containing hydrophilic polymer is carboxymethyl cellulose or hyaluronic acid aldehyde or combinations thereof.

In another embodiment, the top coating comprises at least one layer of an azetidinium-containing polymer and is formed by contacting the contact lens with the prime coating thereon with a solution of the azetidinium-containing polymer.

As used in this application, the azetidinium-containing polymer is a polycationic polymer including azetidinium groups of

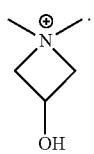

Azetidinium ion is capable of reacting with the amino groups of the anchoring hydrophilic polymer to form covalent linkages as shown in Scheme I.

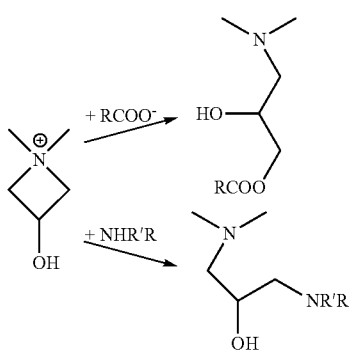

In a further embodiment, the top coating comprises at least one layer of a carboxylic acid-containing hydrophilic polymer and at least one layer of an azetidinium-containing polymer. Such top coating can be formed by successively contacting the contact lens with the prime coating thereon, not in particular order, with a solution of a carboxylic acid-containing hydrophilic polymer and a solution of an azetidinium-containing polymer, but with the preference of a process involving contacting first with the solution of a carboxylic acid-containing hydrophilic polymer and a solution of an azetidinium-containing polymer. It is believed that because the layers of the coating materials may be intertwined with each other in the coating, the azetidinium ions of the azetidinium-containing polymer can form covalent linkages with the carboxylic acid groups and amino groups according to the reactions shown in Scheme I so as to chemically bind the top coating to the prime coating.

In a preferred embodiment, the top coating comprises at least two bilayers, each consisting of one layer of a carboxylic acid-containing hydrophilic polymer and at least one layer of an azetidinium-containing polymer.

Because the top coating is being covalently bound to the prime coating, the hydrophilic coating of the invention has a good durability characterized by surviving a digital rubbing test. In addition, because of the consumption of negative charged groups, carboxylic acids, in the coating by the azetidinium ions of the azetidinium-containing polymer, the hydrophilic coating of the invention have less tendency to uptake PHMB from lens care solutions.

In accordance with the invention, the solution of carboxylic acid-containing hydrophilic polymer or azetidinium-containing polymer is preferably an aqueous solution.

An azetidinium-containing polymer can be prepared from the epichlorohydrin functionalization of a polyamine polymer or of a polymer containing primary or secondary amino groups. For example, a homopolymer or copolymer of aminoalkyl(meth)acrylate, mono-alkyl(meth)acrylate, aminoalkyl(meth)acrylamide, or mono-alkyl(meth)acrylamide can react with epichlorohydrin to form an azetidinium-containing polymer. The reaction conditions for azetidinium functionalization of a polyamine polymer are taught in EP1465931 (herein incorporated by reference in its entirety). A preferred azetidinium-containing polymer is polyaminoamide-epichlorohydrin (PAE) (or polyamide-polyamine-epichlorohydrin or polyamide-epichlorohydrin), such as, for example, Kymene® resins from Hercules.

In a preferred embodiment, the top coating further comprise one or more layers of a polycationic polymer. Examples of polycationic polymers include, without limitation, a polyallylamine (PAH), a polyethyleneimine (PEI), a polyvinylamine, a poly(vinylbenzyl-tri-$C_1$-$C_4$-alkylammonium salt), poly(vinylpyridinium salt), polyquat. The above mentioned polymers comprise in each case the free amine, a suitable salt thereof as well as any quarternized form, if not specified otherwise.

In general, the step of contacting of a contact lens with a solution of a coating material, such as, an anchoring hydrophilic polymer, a carboxylic acid-containing hydrophilic polymer, an azetidinium-containing polymer, or a polycationic polymer can be carried at a temperature of from about 10° C. to about 125° C., preferably from about 20° C. to about 80° C., more preferably from about 25° C. to about 60° C.

In a preferred embodiment, a final layer of a carboxylic acid-containing hydrophilic polymer or an azetidinium-containing polymer is applied onto the contact lens in a lens package which is sealed and autoclave at a temperature of about 115° C. to 125° C. for a period of from about 15 minutes to about 90 minutes.

In another aspect, the invention provides a silicone hydrogel contact lens. The contact lens of the invention comprises a core silicone hydrogel material and a hydrophilic coating, wherein the core silicone hydrogel material comprises azlactone moieties directly derived from an azlactone-containing vinylic monomer or macromer contained in a lens forming material for making the core silicone hydrogel material, wherein the hydrophilic coating comprises a prime coating and a top coating, wherein the prime coating is a layer of an anchoring hydrophilic polymer having primary or secondary groups or thiol groups and is covalently attached directly to the core silicone hydrogel material through covalent linkages each formed between one azlactone moiety at or near the surface of the contact lens and one primary or secondary amino group or thiol group, wherein the top coating comprises at least one layer of a carboxylic acid-containing hydrophilic polymer and/or at least one layer of azetidinium-containing polymer, wherein the layer of the carboxylic acid-containing hydrophilic polymer and/or the layer of the azetidinium-containing polymer is chemically and/or physically bound to the layer of the anchoring hydrophilic polymer, wherein the silicone hydrogel contact lens has an oxygen permeability of at least 40 barrers, a surface wettability characterized by a water contact angle of about 100 degrees or less, and a good coating durability characterized by surviving a digital rubbing test.

A silicone hydrogel contact lens of the invention has a wettable surface characterized by having an averaged water contact angle of about 100 degrees or less, preferably about 90 degrees or less, more preferably about 80 degrees or less, even more preferably about 70 degrees or less, most preferably about 60 degrees or less.

A silicone hydrogel contact lens of the invention has an oxygen permeability of preferably at least about 40 barrers, more preferably at least about 50 barrers, even more preferably at least about 60 barrers. In accordance with the invention, an oxygen permeability is an apparent (directly measured when testing a sample with a thickness of about 100 microns) oxygen permeability according to procedures described in Examples. A silicone hydrogel contact lens of the invention has a center thickness of about 30 to about 200 microns, more preferably about 40 to about 150 microns, even more preferably about 50 to about 120 microns, and most preferably about 60 to about 110 microns.

A silicone hydrogel contact lens of the invention can further have an elastic modulus of about 1.5 MPa or less, preferably about 1.2 MPa or less, more preferably about 1.0 or less, even more preferably from about 0.3 MPa to about 1.0 MPa.

A silicone hydrogel contact lens of the invention further has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A silicone hydrogel contact lens of the invention further has a water content of preferably from about 18% to about 70%, more preferably from about 20% to about 60% by weight when fully hydrated. The water content of a silicone hydrogel contact lens can be measured according to Bulk Technique as disclosed in U.S. Pat. No. 5,849,811.

Above described various embodiments and preferred embodiments of coating materials, polymerizable compositions, prime coatings, and top coatings can be used in this aspect of the invention.

The previous disclosure will enable one having ordinary skill in the art to practice the invention. In order to better enable the reader to understand specific embodiments and the advantages thereof, reference to the following examples is suggested.

EXAMPLE 1

Oxygen Permeability Measurements

The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H.D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app}=Jt/(P_{oxygen})$$

where J=oxygen flux [microliters O$_2$/cm$^2$-minute]
$P_{oxygen}=(P_{measured}-P_{water}$ vapor$)=($%O$_2$ in air stream$)$ [mm Hg]=partial pressure of oxygen in the air stream
$P_{measured}$=barometric pressure (mm Hg)
$P_{water}$ vapor =0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
$Dk_{app}$ is expressed in units of barrers.

The oxygen transmissibility (Dk/t) of the material may be calculated by dividing the oxygen permeability ($Dk_{app}$) by the average thickness (t) of the lens.

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients (D/D$_{ref}$) in reference to a lens material, Alsacon, as reference material. Alsacon has an ionoflux diffusion coefficient of $0.314 \times 10^{-3}$ mm$^2$/minute.

Water Contact Angle Measurements.

Water contact angle on a contact lens is a general measure of the surface hydrophilicity (or wettability) of the contact lens. In particular, a low water contact angle corresponds to more hydrophilic surface. Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 2 μl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-up Time (WBUT) Tests.

The wettabilty of the lenses (after autoclave) is also assessed by determining the time required for the water film to start breaking on the lens surface. Briefly, lenses are removed from the vial and washed 3 times in ~200 ml of fresh DI water in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from DI water and are assigned a WBUT of 0 seconds. Lenses exhibiting WBUT≥5 seconds are considered wettable and are expected to exhibit adequate wettability (ability to support the tear film) on-eye.

Coating Durability Tests.

The durability of the coating (ability to resist loss of coating efficacy) is assessed by rubbing the samples manually for 2 minutes. Nitrile gloves are worn while rubbing the lenses in the palm of one hand using the index finger of the other hand. The water contact angle, using the procedure described above, is performed on the lenses before and after the durability testing. Lenses exhibiting good coating durability show very little increase in contact angle after rubbing and also maintain excellent wettability (WBUT ≥5 seconds).

PHMB (Polyhexamethylene Biguanide) Uptake Measurement.

Five lenses are removed from package, blotted and placed in a 125 ml polypropylene Nalgene bottle. Then, add 100 ml of Aquify MPS solution, cap the bottle and swirl the lens in the solution for 7 days at room temperature (25±2° C.). The solution is analyzed for PHMB HCl. A control solution containing 100 ml of Aquify MPS solution in the polypropylene container at room temperature without lenses, was also analyzed for PHMB HCl concentration. The PHMB uptake of the test lenses are determined based on the depletion in PHMB HCl concentration with respect to the control solution.

EXAMPLE 2

Preparation of Chain-Extended Polydimethylsiloxane Vinylic Macromer with Terminal Methacrylate Groups (CE-PDMS Macromer)

In the first step, α,ω-bis(2-hydroxyethoxypropyl)-polydimethylsiloxane (Mn=2000, Shin-Etsu, KF-6001a) is capped with isophorone diisocyanate by reacting 49.85 g of α,ω-bis(2-hydroxyethoxypropyl)-polydimethylsiloxane with 11.1 g isophorone diisocyanate (IPDI) in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum (2×10$^{-2}$ mBar). Then, under an atmosphere of dry nitrogen, 320 g of distilled MEK is then added into the reactor and the mixture is stirred thoroughly. 0.235 g of DBTDL are added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. 0.235 g of DBTDL are added, and the reactor is held at 55° C. overnight under a blanket of dry nitrogen. The next day, MEK is removed by flash distillation. The reactor is cooled and 22.7 g of IEM are then charged to the reactor followed by 0.235 g of DBTDL. After 3 hours, an additional 3.3 g of IEM are added and the reaction is allowed to proceed overnight. The following day, the reaction mixture is cooled to 18° C. to obtain CE-PDMS macromer.

EXAMPLE 3

Preparation of Lens Formulations

Three lens formulations are prepared by dissolving, in ethyl acetate, CE-PDMS macromer prepared in Example 2 and other components as listed in Table 1. Note: All the components described below are added first and allowed to dissolve. VDMA is added to the formulation, rolled for ~1 hr and then cast immediately.

TABLE 1

| Formulation No. | CE-PDMS (%) | Tris-Am (%) | DMA (%) | EtOAc (%) | DC1173 (%) | VDMA (%) | EGDMA (%) |
|---|---|---|---|---|---|---|---|
| 2-100-1 | 33 | 23 | 13 | 25 | 1.0 | 5.0 | — |
| 9-100-1 | 33 | 23 | 13 | 24 | 1.0 | 5.0 | 1.0 |
| 9-100-2 | 33 | 23 | 13 | 21.5 | 1.0 | 2.5 | 1.0 |

Tris-Am: N-[tris(trimethylsiloxy)-silylpropyl]acrylamide
DMA: N,N-dimethylacrylamide
EtOAc: ethyl acetate
DC 1173: Darocur 1173
VDMA: 2-vinyl-4,4-dimethyl azlactone
EGDMA: ethylenglycoldimethacrylate Preparation of Lenses Female portions of polypropylene lens molds are filled with about 75 microliters of a lens-forming material prepared as above, and the molds are closed with the male portion of the polypropylene lens molds (base curve molds). Contact lenses are obtained by curing the closed molds for about 5 min in a double-sided UV cure box equipped with Phillips lights (40 watt, F405) with the top light intensity of about 3.61 mW/cm$^2$ and a bottom light intensity of about 3.54 mW/cm$^2$.

Preparation of Coating Solutions

PEI (polyethyleneimine, Mw 50,000-100,000) coating solution is prepared by adding 20 g of 30% stock aqueous solution in 80 ml of 1-propanol (1-PrOH). The coating solutions of CMC (carbxymethyl cellulose sodium salt, Mw 250, 000), of Kymene (polycup 8210, polyamide-epichlorohydrin resin), and of HAA (custom ring-opened hyaluronic acid to generate aldehyde groups (kwl-080415-001)) are prepared by adding the appropriate concentration of the polymer in DI water, adding 10 mM of acetic acid (buffering agent) and adjusting the final pH to 5 using 1N NaOH solution. The 0.1% Kymene (polycup 8210, polyamide-epichlorohydrin resin) coating solution is prepared by adding 0.1 g of Kymene solution supplied by manufacturer (it is shipped as a ~21 wt % solution) to 100 ml of DI water, adding 10 mM of acetic acid (buffering agent) and adjusting the final pH to 5 using 1N NaOH solution.

Coating of Lenses

The following three process are used in applying coatings onto contact lenses. Note: All the dip steps are performed at room temperature.

Coating I. Contact lenses prepared above are: (1) dipped in PEI coating solution for 3 minutes; (2) dipped in DI water for 55 seconds; (3) extracted with EtOAc for 5 minutes; (4) dipped in DI water for 3 minutes; (5) packaged in vials containing phosphate buffered saline (PBS, pH?) or PBS including 0.1% by weight of HAA; and (6) autoclaved at about 121° C. for 30 minutes Coating II. Contact lenses prepared above are: (1) dipped in PEI coating solution for 3 minutes; (2) dipped in DI water for 55 seconds; (3) extracted with EtOAc for 5 minutes; (4) dipped in DI water for 3 minutes; (5) dipped in 0.1% CMC coating solution (pH 5) for 55 seconds; (6) dipped in DI water for 30 seconds; (7) dipped in 0.1% Kymene coating solution (pH 5) for 55 seconds; (8) dipped in DI water for 30 seconds; (9) dipped in 0.1% CMC coating solution (pH 5) for 55 seconds; (10) dipped in DI water for 30 seconds; (11) dipped in 0.1% Kymene coating solution (pH 5) for 55 seconds; (12) packaged in vials containing phosphate buffered saline (PBS, pH?) or PBS including 0.1% by weight of HAA; and (12) autoclaved at about 121° C. for 30 minutes.

Coating III. Contact lenses prepared above are: (1) dipped in PEI coating solution for 3 minutes; (2) dipped in DI water for 55 seconds; (3) extracted with EtOAc for 5 minutes; (4) dipped in DI water for 3 minutes; (5) dipped in 0.1% HAA coating solution (pH 5) for 55 seconds; (6) dipped in DI water for 30 seconds; (7) dipped in 0.1% Kymene coating solution (pH 5) for 55 seconds; (8) dipped in DI water for 30 seconds; (9) dipped in 0.1% HAA coating solution (pH 5) for 55 seconds; (10) dipped in DI water for 30 seconds; (11) dipped in 0.1% Kymene coating solution (pH 5) for 55 seconds; (12) packaged in vials containing phosphate buffered saline (PBS, pH?) or PBS including 0.1% by weight of HAA; and (12) autoclaved at about 121° C. for 30 minutes.

The diameter, water contact angle (WCA), wettability of coated lenses are determined and reported in Table 2.

TABLE 2

| Formulation | Coating | Packaging | Diameter (mm) | WCA (avg.°) | Wettability (WBUT, s) |
|---|---|---|---|---|---|
| 2-100-1 | I | PBS | 15.51 | 107 | 0-1 |
| | I | PBS-HAA | 15.27 | 83 | 1-2 |
| | II | PBS | 15.59 | 81 | w* |
| | II | PBS-HAA | 15.27 | 78 | w |
| | III | PBS | 15.51 | 76 | w |
| | III | PBS-HAA | 15.35 | 81 | w |
| 9-100-1 | II | PBS | 15.35 | 81 | w |
| | II | PBS-HAA | 14.96 | 86 | w |
| | III | PBS | 15.59 | 66 | w |
| | III | PBS-HAA | 15.27 | 70 | w |
| 9-100-2 | II | PBS | 14.72 | 93 | w |
| | II | PBS-HAA | 14.56 | 101 | w |
| | III | PBS | 14.72 | 69 | w |
| | III | PBS-HAA | 14.33 | 61 | w |

*W: wettable (WBUT ≥ 5 sec.) after rinsing by DI water.

EXAMPLE 4

Preparation of Lenses

A lens formulation is prepared to have the following composition: CE-PDMS macromer prepared in Example 2 (30.9%), Tris-Am (23.8%), DMA (18%), DC1173 (1.0%), VDMA (2.5%) and methylenebisacrylamide (MBA, 0.4%) and tert-amyl alcohol (23.2%). A control lens formulation (i.e., without VDMA) is prepared by not adding VDMA to the above formulation. Contact lenses are prepared according to the procedures described in Example 3.

Preparation of Coating Solutions

The coating solutions are prepared according to the procedures described in Example 3. In this Example, a solution of PEI with molecular weight of 2000 kDa (Lupasol SK, ~25 wt %, from BASF) is prepared by adding 1-PrOH to PEI stock solution to have a concentration of about 20% by weight (designated as 20% Lupasol SK solution in order to distinguished from PEI solution prepared in Example 3). The 0.1% Lupasol SK aqueous solution is prepared by adding 0.1 g of Lupasol SK solution supplied by manufacturer to 100 ml of DI water, adding 10 mM of acetic acid (buffering agent) and adjusting the final pH to 5 using 1N NaOH solution.

Coating of Lenses

The following three process are used in applying coatings onto contact lenses.

Coating I. Contact lenses prepared above are: (1) extracted with methyl ethyl ketone (MEK) for 5 minutes; (2) dipped in DI water for 55 seconds; (3) dipped in PEI solution (20% by weight, in 1-PrOH) for 3 minutes; (4) dipped in DI water for 3 minutes; (5) dipped in 0.1% HAA aqueous solution (pH 5) for 55 seconds; (6) dipped in DI water for 30 seconds; (7) dipped in 0.1% Kymene aqueous solution (pH 5) for 55 seconds; (8) dipped in DI water for 30 seconds; (9) dipped in 0.1% HAA aqueous solution (pH 5) for 55 seconds; (10) dipped in DI water for 30 seconds; (11) dipped in 0.1% Kymene aqueous solution (pH 5) for 55 seconds; (12) packaged in vials containing phosphate buffered saline (PBS, pH 7.4) or PBS including 0.1% by weight of HAA; and (12) autoclaved at about 121° C. for 30 minutes.

Coating II. Contact lenses prepared above are: (1) dipped in Lupasol SK solution (20% by weight, in 1-PrOH) for 3 minutes; (2) dipped in DI water for 55 seconds; (3) extracted with MEK for 5 minutes; (4) dipped in DI water for 3 minutes; (5) dipped in 0.1% HAA aqueous solution (pH 5) for 55 seconds; (6) dipped in DI water for 30 seconds; (7) dipped in 0.1% Kymene aqueous solution (pH 5) for 55 seconds; (8) dipped in DI water for 30 seconds; (9) dipped in 0.1% HAA aqueous solution (pH 5) for 55 seconds; (10) dipped in DI water for 30 seconds; (11) dipped in 0.1% Kymene aqueous solution (pH 5) for 55 seconds; (12) packaged in vials containing PBS including 0.1% by weight of HAA; and (12) autoclaved at about 121° C. for 30 minutes.

Coating III. Contact lenses prepared above are: (1) dipped in PEI solution (20% by weight, in 1-PrOH) for 3 minutes; (2) dipped in DI water for 55 seconds; (3) extracted with EtOAc for 5 minutes; (4) dipped in DI water for 3 minutes; (5) dipped in 0.1% HAA aqueous solution (pH 5) for 55 seconds; (6) dipped in DI water for 30 seconds; (7) dipped in 0.1% Lupasol SK aqueous solution (pH 5) for 55 seconds; (8) dipped in DI water for 30 seconds; (9) dipped in 0.1% HAA aqueous solution (pH 5) for 55 seconds; (10) dipped in DI water for 30 seconds; (11) dipped in 0.1% Lupasol SK aqueous solution (pH 5) for 55 seconds; (12) packaged in vials containing PBS including 0.1% by weight of HAA; and (12) autoclaved at about 121° C. for 30 minutes.

The diameter, water contact angle (WCA), wettability of coated lenses are determined and reported in Table 3.

TABLE 3

| Formulation | Coating | Diameter (mm) | WCA (avg.°) | Wettability (WBUT, s) |
|---|---|---|---|---|
| Without VDMA | II | 13.9 | 112 | 0 |
| With 2.5% VDMA | I | 14.5 | 71 | 6-7 |
|  | II | 14.7 | 73 | 5-6 |
|  | III | 14.7 | 73 | 1-2 |

EXAMPLE 5

Preparation of Lenses

A lens formulation is prepared to have the following composition: CE-PDMS macromer prepared in Example 2 (30.9%), Tris-Am (23.8%), DMA (18%), DC1173 (1.0%), VDMA (2.5%) and methylenebisacrylamide (MBA, 0.4%) and tert-amyl alcohol (23.2%). Contact lenses are prepared according to the procedures described in Example 3.

Preparation of Coating Solutions

The coating solutions are prepared according to the procedures described in Examples 3 and 4. In this Example, a CMC with a molecular weight of 700 kDa (from Acros Organics, Product #AC332641000, Degree of substitution (DS)=0.9) is used in preparing the 0.1% CMC aqueous solution.

Coating of Lenses

The following three process are used in applying coatings onto contact lenses.

Coating I. Contact lenses prepared above are: (1) dipped in Lupasol SK solution (10% by weight, in 1-PrOH) for 3 minutes; (2) dipped in DI water for 55 seconds; (3) extracted with MEK for 5 minutes; (4) dipped in DI water for 3 minutes; (5) dipped in 0.1% HAA aqueous solution (pH 5) for 55 seconds; (6) dipped in DI water for 30 seconds; (7) dipped in 0.1% Kymene aqueous solution (pH 5) for 55 seconds; (8) dipped in DI water for 30 seconds; (9) dipped in 0.1% HAA aqueous solution (pH 5) for 55 seconds; (10) dipped in DI water for 30 seconds; (11) dipped in 0.1% Kymene aqueous solution (pH 5) for 55 seconds; (12) packaged in vials containing PBS including 0.1% by weight of HAA; and (12) autoclaved at about 121° C. for 30 minutes.

Coating II. Contact lenses prepared above are: (1) dipped in Lupasol SK solution (20% by weight, in 1-PrOH) for 3 minutes; (2) dipped in DI water for 55 seconds; (3) extracted with MEK for 5 minutes; (4) dipped in DI water for 3 minutes; (5) dipped in 0.1% CMC (700 kDa) aqueous solution (pH 5) for 55 seconds; (6) dipped in DI water for 30 seconds; (7) dipped in 0.1% Kymene aqueous solution (pH 5) for 55 seconds; (8) dipped in DI water for 30 seconds; (9) dipped in 0.1% CMC (700 kDa) aqueous solution (pH 5) for 55 seconds; (10) dipped in DI water for 30 seconds; (11) dipped in 0.1% Kymene aqueous solution (pH 5) for 55 seconds; (12) packaged in vials containing PBS including 0.1% by weight of HAA; and (12) autoclaved at about 121° C. for 30 minutes.

Coating III. Contact lenses prepared above are: (1) dipped in Lupasol SK solution (20% by weight, in 1-PrOH) for 3 minutes; (2) dipped in DI water for 55 seconds; (3) extracted with EtOAc for 5 minutes; (4) dipped in DI water for 3 minutes; (5) dipped in 0.1% CMC (700 kDa) aqueous solution (pH 5) for 55 seconds; (6) dipped in DI water for 30 seconds; (7) dipped in 0.1% Lupasol SK aqueous solution (pH 5) for 55 seconds; (8) dipped in DI water for 30 seconds; (9) dipped in 0.1% CMC (700 kDa) aqueous solution (pH 5) for 55 seconds; (10) dipped in DI water for 30 seconds; (11) dipped in 0.1% Lupasol SK aqueous solution (pH 5) for 55 seconds; (12) packaged in vials containing PBS including 0.1% by weight of HAA; and (12) autoclaved at about 121° C. for 30 minutes.

Coating IV. Contact lenses prepared above are: (1) dipped in PEI solution (20% by weight, in 1-PrOH) for 3 minutes; (2) dipped in DI water for 55 seconds; (3) extracted with EtOAc for 5 minutes; (4) dipped in DI water for 3 minutes; (5) dipped in 0.01% HAA aqueous solution (pH 5) for 55 seconds; (6) dipped in DI water for 30 seconds; (7) dipped in 0.1% Kymene aqueous solution (pH 5) for 55 seconds; (8) dipped in DI water for 30 seconds; (9) dipped in 0.01% HAA aqueous solution (pH 5) for 55 seconds; (10) dipped in DI water for 30 seconds; (11) dipped in 0.1% Kymene aqueous solution (pH 5) for 55 seconds; (12) packaged in vials containing PBS including 0.1% by weight of HAA; and (12) autoclaved at about 121° C. for 30 minutes.

The diameter, water contact angle (WCA), wettability and durability of coated lenses are determined and reported in Table 4.

TABLE 4

| Coating | Diameter (mm) | WCA (avg.°) | Wettability |
|---|---|---|---|
| I | 14.7 | 91 | Wettable; however did not resist rubbing |
| II | 14.5 | 57 | Wettable and resisted rubbing |
| III | 14.6 | 89 | Wettable; however did not resist rubbing |
| IV | 14.6 | 77 | Wettable and resisted rubbing |

EXAMPLE 6

Preparation of Lenses

Two lens formulation are prepared to have the following compositions shown in Table 5. Contact lenses are prepared according to the procedures described in Example 3.

TABLE 5

| Formulation No. | CE-PDMS (%) | Tris-Am (%) | DMA (%) | Solvent (%) | DC1173 (%) | VDMA (%) |
|---|---|---|---|---|---|---|
| 4_8_2 | 31.4 | 23.7 | 19.1 | 23.4 (tAA) | 1.2 | 1.2 |
| 4_8_3 | 30.4 | 23.1 | 19.9 | 22.9 (2-PrOH) | 1.3 | 2.3 | tAA: tert-amyl alcohol;
2-PrOH: 2-propanol

Preparation of Coating Solutions

The coating solutions are prepared according to the procedures described in Examples 3-5.

Coating of Lenses

The following three process are used in applying coatings onto contact lenses.

Coating I. Contact lenses prepared above are: (1) dipped in Lupasol SK solution (20% by weight, in 1-PrOH) for 3 minutes; (2) dipped in DI water for 55 seconds; (3) extracted with MEK for 5 minutes; (4) dipped in DI water for 3 minutes; (5) dipped in 0.1% CMC (700 kDa) aqueous solution (pH 5) for 55 seconds; (6) dipped in DI water for 30 seconds; (7) dipped in 0.1% Kymene aqueous solution (pH 5) for 55 seconds; (8) dipped in DI water for 30 seconds; (9) dipped in 0.1% CMC (700 kDa) aqueous solution (pH 5) for 55 seconds; (10) dipped in DI water for 30 seconds; (11) dipped in 0.1% Kymene aqueous solution (pH 5) for 55 seconds; (12) packaged in vials containing PBS including 0.1% by weight of HAA; and (12) autoclaved at about 121° C. for 30 minutes.

Coating II. Contact lenses prepared above are: (1) dipped in Lupasol SK solution (20% by weight, in 1-PrOH) for 3 minutes; (2) dipped in DI water for 55 seconds; (3) extracted with MEK for 5 minutes; (4) dipped in DI water for 3 minutes; (5) dipped in 0.1% CMC (700 kDa) aqueous solution (pH 5) for 55 seconds; (6) dipped in DI water for 30 seconds; (7) dipped in 0.1% Kymene aqueous solution (pH 5) for 55 seconds; (8) dipped in DI water for 30 seconds; (9) dipped in 0.1% CMC (700 kDa) aqueous solution (pH 5) for 55 seconds; (10) dipped in DI water for 30 seconds; (11) dipped in 0.1% Kymene aqueous solution (pH 5) for 55 seconds; (12) packaged in vials containing PBS including 0.1% by weight of CMC (700 kDa); and (12) autoclaved at about 121° C. for 30 minutes.

Coating III. Contact lenses prepared above are: (1) dipped in Lupasol SK solution (20% by weight, in 1-PrOH) for 3 minutes; (2) dipped in DI water for 55 seconds; (3) extracted with MEK for 5 minutes; (4) dipped in DI water for 3 minutes; (5) dipped in 0.1% HAA aqueous solution (pH 5) for 55 seconds; (6) dipped in DI water for 30 seconds; (7) dipped in 0.1% Kymene aqueous solution (pH 5) for 55 seconds; (8) dipped in DI water for 30 seconds; (9) dipped in 0.1% HAA aqueous solution (pH 5) for 55 seconds; (10) dipped in DI water for 30 seconds; (11) dipped in 0.1% Kymene aqueous solution (pH 5) for 55 seconds; (12) packaged in vials containing PBS including 0.1% by weight of HAA; and (12) autoclaved at about 121° C. for 30 minutes.

Coating IV. Contact lenses prepared above are: (1) dipped in Lupasol KS solution (20% by weight, in 1-PrOH) for 3 minutes; (2) dipped in DI water for 55 seconds; (3) extracted with MEK for 5 minutes; (4) dipped in DI water for 3 minutes; (5) dipped in 0.1% HAA aqueous solution (pH 5) for 55 seconds; (6) dipped in DI water for 30 seconds; (7) dipped in 0.1% Kymene aqueous solution (pH 5) for 55 seconds; (8) dipped in DI water for 30 seconds; (9) dipped in 0.1% HAA aqueous solution (pH 5) for 55 seconds; (10) dipped in DI water for 30 seconds; (11) dipped in 0.1% Kymene aqueous solution (pH 5) for 55 seconds; (12) packaged in vials containing PBS including 0.1% by weight of CMC (700 kDa); and (12) autoclaved at about 121° C. for 30 minutes.

The diameter, water contact angle (WCA), wettability and durability of coated lenses are determined and reported in Table 6.

TABLE 6

| Coating | Packaging Saline | Diameter (mm) | WCA (avg.°) | Wettability |
|---|---|---|---|---|
| I | 0.1% HAA | 14.1 | 54 | Wettable and resists rubbing |
| II | 0.1% CMC | 14.1 | 68 | Wettable and resists rubbing |
| III | 0.1% HAA | 14.3 | 49 | Wettable and resists rubbing |
| IV | 0.1% CMC | 14.2 | 50 | Wettable and resists rubbing |

EXAMPLE 7

A lens formulation is prepared to have the following composition: CE-PDMS macromer prepared in Example 2 (31.5%), Tris-Am (22.3%), DMA (12.2%), DC1173 (1.0%), VDMA (9.3%) and EtOAc (23.7%). Contact lenses are prepared according to the procedures described in Example 3.

Lenses molded above are subjected to the following sequence of processing steps: dipping in 5 wt % PEI (polyethyleneimine, Mw 50,000-100,000) in 1-propanol for 3 minutes; dipping in DI water for 1 minute; dipping in EtOAc for 5 minutes; dipping in DI water for 3 minutes; packaged in PBS saline and autoclaved at about 121° C. for about 30 minutes. The final lens after autoclave had a diameter of 16.9 mm measured using a microscope at 12.7× magnification.

The diameter data for lenses prepared from the formulations containing 1.2%, 2.5% and 5% of VDMA are obtained in Example 6 (4_8_2), Example 4 and Example 3 (2-100-1) respectively. Analysis of the lens diameter data of the lenses prepared from the four lens formulation containing VDMA at different concentrations (1.2%, 2.5%, 5% and 9.3%) yields a good linear relationship between the amount of VDMA in the lens formulation and the final swelling of the lens post-autoclave, lens diameter (mm)=0.3183[VDMA wt %]+13.787 ($R^2$=0.9867).

EXAMPLE 8

A lens formulation is prepared to have the following composition: CE-PDMS macromer prepared in Example 2 (30.9%), Tris-Am (24.3%), DMA (18.5%), DC1173 (1.0%), VDMA (1.3%), MBA (0.2%) and t-amyl alcohol (23.2%). Contact lenses are prepared according to the procedures described in Example 3.

Lenses molded above are subjected to the following sequence of processing steps: dipping in 20 wt % of Lupasol SK solution (2000 kDa PEI solution) in mixture of water and 1-propanol for 3 minutes; dipping in DI water for 45 seconds; dipping in MEK for 5 minutes; dipping in DI water for 2 minutes; dipping in 0.1% 700 kDa CMC solution (pH 5, 10 mM acetic acid as buffer) for 45 seconds; dipping in DI water for 45 seconds; dipping in 0.1% Kymene 8210 (pH 5, 10 mM acetic acid as buffer) for 45 seconds; dipping in DI water for 45 seconds; dipping in 0.1% 700 kDa CMC solution (pH 5, 10 mM acetic acid as buffer) for 45 seconds; dipping in DI water for 45 seconds; dipping in 0.1% Kymene 8210 (pH 5, 10 mM acetic acid as buffer) for 45 seconds; dipping in DI water for 45 seconds; packaged in PBS saline containing 0.1% 700 kDa CMC; and autoclaved at about 121° C. for about 30 minutes.

It is determined that coated contact lenses have an elastic modulus of about 1.1 MPa, an elongation to break of about 311%, an ion permeability of 1.6 relative to Alsacon, an apparent Dk of about 112 barrers (intrinsic Dk of about 200 barrers), a diameter of 14.9 mm (measured with Optispec), a PHMB uptake of 15.8 μg/lens (control lenses without coating have a PHMB uptake of about 17.7 μg/lens). This shows that the lens coating has negligible PHMB uptake.

The averaged water contact angle (measured by Sessile Drop) of the coated contact lenses is 65 degrees. After 10 simulated cleaning cycles with RepleniSH® (with digital rubbing), the water contact angle of the coated lenses is about 83 degrees. After 10 simulated cleaning cycles with ReNu® (with digital rubbing), the water contact angle of the coated lenses is about 68 degrees.

Cell growth Inhibition test (CGI) of the coated lenses is 8%, showing that the coated lenses are considered non cytotoxic. Modified USP Elution test of the packaging saline for the coated lenses show grade 0-0-0, indicating that the packaging saline is considered non-cytotoxic.

EXAMPLE 9

Preparation of Lenses

Three formulations are prepared as described below. Contact lenses are prepared according to the procedures described in Example 3.

| Formulation No. | CE-PDMS (%) | Tris-Am (%) | DMA (%) | tAA (%) | MBA (%) | DC1173 (%) | VDMA (%) |
|---|---|---|---|---|---|---|---|
| 1.3% VDMA | 30.8 | 25.5 | 17.5 | 23.8 | 0.2 | 1 | 1.3 |
| 0.65% VDMA | 31 | 25.6 | 17.6 | 23.9 | 0.2 | 1 | 0.65 |
| 0.325% VDMA | 31.1 | 25.7 | 17.6 | 24 | 0.2 | 1 | 0.32 |

Coating of Lenses.

Lenses molded above are subjected to the following sequence of processing steps: dipping in MEK for 5 minutes; dipping in DI water for 45 seconds; dipping in 20 wt % of Lupasol SK solution (2000 kDa PEI solution) in mixture of water and 1-propanol for 3 minutes; dipping in DI water for 2 minutes; dipping in 0.1% 700 kDa CMC solution (pH 5, 10 mM acetic acid as buffer) for 56 seconds; dipping in DI water for 30 seconds; dipping in 0.1% Kymene 8210 (pH 5, 10 mM acetic acid as buffer) for 56 seconds; dipping in DI water for 30 seconds; dipping in 0.1% 700 kDa CMC solution (pH 5, 10 mM acetic acid as buffer) for 56 seconds; dipping in DI water for 30 seconds; dipping in 0.1% Kymene 8210 (pH 5, 10 mM acetic acid as buffer) for 56 seconds; dipping in DI water for 30 seconds; packaged in PBS saline containing 0.1% 700 kDa CMC; and autoclaved at about 121° C. for about 30 minutes.

Lens Characterization.

The water contact angle (WCA) and wettability of lenses after limited rubbing and rinsing (from qualitative handling of lenses) (i.e., indication of durability of coatings) are determined and reported below.

| | 1.3 wt % VDMA | 0.65 wt % VDMA | 0.325 wt % VDMA |
|---|---|---|---|
| Avg. Contact Angle | 75, 73 | 87, 88 | 87, 88 |
| Lens wettability after limited rubbing | wettable | not wettable | not wettable |

EXAMPLE 10

Preparation of Lenses

A lens formulation is prepared to have the following composition: CE-PDMS macromer prepared in Example 2 (30.9%), Tris-Am (25.3%), DMA (17.5%), DC1173 (1.0%), VDMA (1.3%), MBA (0.2%) and tert-amyl alcohol (23.8%). Contact lenses are prepared according to the procedures described in Example 3.

Preparation of Coating Solutions

The coating solutions of CMC (carbxymethyl cellulose sodium salt, Mw 700,000), and of Kymene (polycup 172, polyamide-epichlorohydrin resin), are prepared by adding the appropriate concentration of the polymer in DI water, adding 10 mM of sodium bicarbonate (buffering agent) and adjusting the final pH to 9 using 1N NaOH solution.

Coating of Lenses
Step 1. MEK 324 seconds
Step 2. DI water, 56 seconds
Step 3. 20 wt % Lupasol SK (PEI solution) in 1-Propanol, 180 seconds
Step 4. DI water, 112 seconds
Step 5. 0.01% CMC aqueous solution, 56 seconds
Step 6. DI water, 56 seconds
Step 7. 0.01% Kymene aqueous solution, 56 seconds
Step 8. DI water, 56 seconds
Step 9. 0.01% CMC aqueous solution, 56 seconds
Step 10. DI water, 56 seconds
Step 11. 0.01% Kymene aqueous solution, 56 seconds Control I lenses are made from a lens formulation shown above minus VDMA and subjected to extraction/coating processing steps (i.e., steps 1-11) and packaged/autoclaved.

Control II lenses are made from a lens formulation shown above minus VDMA, subjected to only extraction and hydration (i.e., steps 1 to 2), and packaged/autoclaved.

Sample 1 lenses are made from a lens formulation shown above minus VDMA, subjected to only extraction and hydration (i.e., steps 1 to 2), and packaged/autoclaved.

Sample 2 lenses are made from a lens formulation shown above, subjected to extraction/coating processing steps 1 to 4, and packaged/autoclaved.

Sample 3 lenses are made from a lens formulation shown above, subjected to extraction/coating processing steps 1 to 6, and packaged/autoclaved.

Sample 4 lenses are made from a lens formulation shown above, subjected to extraction/coating processing steps 1 to 8, and packaged/autoclaved.

Sample 5 lenses are made from a lens formulation shown above, subjected to extraction/coating processing steps 1 to 10, and packaged/autoclaved.

Sample 6 lenses are made from a lens formulation shown above, subjected to extraction/coating processing steps 1 to 11, and packaged/autoclaved.

Sample 7 lenses are made from a lens formulation shown above, subjected to extraction/coating processing steps 1 to 11, and packaged in 0.1% CMC PBS packaging solution and autoclaved.

Sample 8 lenses are made from a lens formulation shown above, subjected to extraction/coating processing steps 1 to 11 minus steps 5 and 9 (no CMC exposure), and packaged/autoclaved.

Note: All the samples above packaged in PBS (pH=7.4) unless explicitly identified.

Lens Characterization

Three samples from the control lenses will be analyzed for sessile drop contact angle, visual wettability (qualitative) and handling (qualitative). Samples are characterized as "sticky" when they stick to one another while handling.

Three samples each from Samples 1-6 lenses will be analyzed for sessile drop contact angle, visual wettability (qualitative) and handling (qualitative) both before/after autoclave.

The results are shown in Table 7.

TABLE 7

| | Unautoclaved | | Autoclaved | |
|---|---|---|---|---|
| Sample ID | WCA (degree) | Comments | WCA (degree) | Comments |
| Control I | | | 119 ± 2 | sticky, not wettable |
| Control II | | | 119 ± 5 | sticky, not wettable |
| Sample 1 | 122 ± 1 | sticky, not wettable | 121 ± 1 | sticky, not wettable |
| Sample 2 | 110 ± 4 | wettable | 120 ± 2 | sticky, not wettable |
| Sample 3 | 104 ± 6 | sticky, not wettable | 108 ± 2 | sticky, not wettable |

TABLE 7-continued

|  | Unautoclaved | | Autoclaved | |
| --- | --- | --- | --- | --- |
| Sample ID | WCA (degree) | Comments | WCA (degree) | Comments |
| Sample 4 | 95 ± 4 | 2 out of 3 samples was wettable | 98 ± 7 | sticky, 1-2s WBUT |
| Sample 5 | 96 ± 3 | not wettable, 1-2s | 102 ± 8 | less sticky, 1-2s WBUT |
| Sample 6 | 101 ± 3 | lens was wettable | 86 ± 2 | wettable |
| Sample 7 | | | 74 ± 3 | wettable |
| Sample 8 | 111 ± 4 | sticky, not wettable | 111 ± 6 | sticky, not wettable |

EXAMPLE 11

Preparation of Lenses

A lens formulation is prepared to have the following composition: CE-PDMS macromer prepared in Example 2 (30.9%), Tris-Am (25.3%), DMA (17.5%), DC1173 (1.0%), VDMA (1.3%), MBA (0.2%) and tert-amyl alcohol (23.8%). Contact lenses are prepared according to the procedures described in Example 3.

Preparation of Coating Solutions

The coating solutions of CMC (carbxymethyl cellulose sodium salt, Mw 700,000), and of Kymene (polycup 172, polyamide-epichlorohydrin resin), are prepared by adding the appropriate concentration of the polymer in DI water, adding 10 mM of appropriate buffering agent and adjusting the final pH by adding 1N NaOH or 1N HCl solution. For coating solutions prepared at pH=5 acetic acid was used as the buffering, for pH=7 disodium hydrogen phosphate was used and for pH=9 sodium bicarbonate was used.

Coating of Lenses
Step 1. MEK 324 seconds
Step 2. DI water, 56 seconds
Step 3. 20 wt % Lupasol SK (PEI solution) in 1-Propanol, 180 seconds
Step 4. DI water, 112 seconds
Step 5. CMC aqueous solution, 56 seconds
Step 6. DI water, 56 seconds
Step 7. Kymene aqueous solution, 56 seconds
Step 8. DI water, 56 seconds
Step 9. CMC aqueous solution, 56 seconds
Step 10. DI water, 56 seconds
Step 11. Kymene aqueous solution, 56 seconds Lens Characterization The results are shown in Table 8. The first two columns show the pH of the aqueous coating solutions and the concentrations of the polymer (Kymene and CMC) used. For example, sample 71_53B, the aqueous coating solutions in steps 5, 7, 9 and 11, were maintained at a pH of 5 and the polymer concentration used was 0.01 wt %. The results clearly demonstrate the impact of coating conditions on the durability of the lens coating.

TABLE 8

| | | | Contact Angle | |
| --- | --- | --- | --- | --- |
| pH | Concentration (wt %) | Sample ID | Before durability test | After durability test |
| | 0.01 | 71-53B | 101 ± 7 | 114 ± 2 |
| 5 | 0.05 | 71-57B | 90 ± 4 | 113 ± 6 |
| 5 | 0.1 | 71-52B | 91 ± 7 | 110 ± 1 |
| 7 | 0.01 | 71-59C | 94 ± 5 | 94 ± 5 |
| 7 | 0.05 | 71-55B | 77 ± 3 | 103 ± 5 |
| 7 | 0.1 | 71-59B | 84 ± 1 | 107 ± 14 |
| 9 | 0.01 | 71-53C | 79 ± 3 | 93 ± 1 |
| 9 | 0.05 | 71-57C | 85 ± 3 | 89 ± 16 |
| 9 | 0.1 | 71-52C | 84 ± 8 | 104 ± 6 |

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments including preferred embodiments may be interchanged either in whole or in part or can be combined in any manner and/or used together. Therefore, the spirit and scope of the appended claims should not be limited to the description of the preferred versions contained therein.

What is claimed is:

1. A method of producing a silicone hydrogel contact lens having a hydrophilic coating which is covalently attached to the polymer matrix of the silicone hydrogel contact lens, comprising the steps of:
   (a) polymerizing, in a mold, a polymerizable composition comprising at least one silicone-containing vinylic monomer or macromer and an azlactone-containing vinylic monomer or macromer, thereby forming a silicone hydrogel contact lens having azlactone moieties covalently attached onto the polymer matrix of the contact lens, wherein the azlactone-containing vinylic monomer or macromer is present in an amount of about 0.5% to about 5.0% by weight in the polymerizable composition;
   (b) contacting the contact lens with a solution of an anchoring hydrophilic polymer having pendant primary or secondary amino groups for a period of time sufficient to form a prime coating on the contact lens, wherein the prime coating comprises a layer of the anchoring hydrophilic polymer covalently attached to the surface of the contact lens through one or more covalent linkages each formed between one azlactone moiety at or near the surface of the contact lens and one of the pendant primary or secondary amino groups of the anchoring hydrophilic polymer;
   (c) applying a top coating on top of the prime coating to form the hydrophilic coating with an increased surface hydrophilicity and/or durability with respect to the prime coating, wherein the top coating comprises at least one layer of a carboxylic acid-containing hydrophilic polymer and/or at least one layer of an azetidinium-containing polymer, wherein the layer of the carboxylic acid-containing hydrophilic polymer is formed by contacting the contact lens having the prime coating thereon with a solution of the carboxylic acid-containing hydrophilic polymer, wherein the layer of the azetidinium-containing polymer is formed by contacting the contact lens having the prime coating thereon and optionally the layer of the carboxylic acid-containing hydrophilic polymer with a solution of the azetidinium-containing polymer, wherein the layer of the carboxylic acid-containing hydrophilic polymer and/or the layer of the azetidinium-containing polymer is chemically and/or physically bound to the layer of the anchoring hydrophilic polymer,
wherein the anchoring hydrophilic polymer is a polyhydroxyl polymer which is a derivative of a poly(vinyl alcohol) and has from about 0.5% to about 80%, based on the number of hydroxyl groups in the poly(vinyl alcohol), of units of the formula I

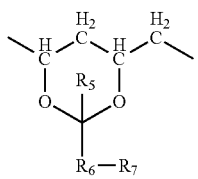

in which $R_5$ is hydrogen, a $C_1$-$C_6$ alkyl group or a cycloalkyl group; $R_6$ is linear or branched alkylene having up to up to 8 carbon atoms; and $R_7$ is a primary or secondary amino group of the formula $N^+H_2(R')X^-$, in which R' is hydrogen or a $C_1$-$C_4$ alkyl radical; and X is a counterion selected from the group consisting of $HSO_4^-$, $F^-$, $Cl^-$, $Br^-$, $I^-CH_3COO^-$, $OH^-$, $BF^-$, or $H_2PO_4^-$.

2. The method of claim 1, wherein the azlactone-containing vinylic monomer or macromer is selected from the group consisting of azlactone-containing vinylic monomers include: 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, 2-vinyl-4,4-dimethyl-1,3-oxazolin-6-one, and combinations thereof.

3. The method of claim 2, wherein the azlactone-containing vinylic monomer or macromer is present in an amount of from about 0.6% to about 2.5% by weight in the polymerizable composition.

4. The method of claim 3, wherein the anchoring hydrophilic polymer has a molecular weight of from about 500,000 to 5,000,000 Daltons.

5. The method of claim 3, wherein the solution of the anchoring hydrophilic polymer is prepared by dissolving the anchoring hydrophilic polymer in a mixture of water and one or more organic solvents, an organic solvent, or a mixture of one or more organic solvent.

6. The method of claim 3, wherein the top coating comprises at least one layer of a carboxylic acid-containing hydrophilic polymer and is formed by contacting the contact lens with the prime coating thereon with a solution of a carboxylic acid-containing hydrophilic polymer.

7. The method of claim 6, wherein the carboxylic acid-containing hydrophilic polymer is carboxymethyl cellulose, hyaluronic acid aldehyde, a linear polyacrylic acid, a branched polyacrylic acid, a polymethacrylic acid, a copolymer of (meth)acrylic acid with at least one hydrophilic vinylic monomer, a maleic or fumaric acid copolymer, or combinations thereof.

8. The method of claim 6, wherein the carboxylic acid-containing hydrophilic polymer is carboxymethyl cellulose, hyaluronic acid aldehyde, or combinations thereof.

9. The method of claim 1, wherein the top coating comprises at least one layer of an azetidinium-containing polymer.

10. The method of claim 9, wherein the top coating comprises at least one bilayer consisting of one layer of one carboxylic acid-containing hydrophilic polymer and one layer of an azetidinium-containing polymer.

11. The method of claim 1, comprising a step of applying a final layer of a carboxylic acid-containing hydrophilic polymer or azetidinium-containing polymer onto the contact lens in a lens package which is sealed and autoclave at a temperature of about 115° C. to about 125° C. for a period of from about 15 minutes to about 90 minutes.

12. A method of producing a silicone hydrogel contact lens having a hydrophilic coating which is covalently attached to the polymer matrix of the silicone hydrogel contact lens, comprising the steps of:
(a) polymerizing, in a mold, a polymerizable composition comprising at least one silicone-containing vinylic monomer or macromer and an azlactone-containing vinylic monomer or macromer, thereby forming a silicone hydrogel contact lens having azlactone moieties covalently attached onto the polymer matrix of the contact lens, wherein the azlactone-containing vinylic monomer or macromer is present in an amount of about 0.5% to about 5.0% by weight in the polymerizable composition;
(b) contacting the contact lens with a solution of an anchoring hydrophilic polymer having pendant primary or secondary amino groups for a period of time sufficient to form a prime coating on the contact lens, wherein the prime coating comprises a layer of the anchoring hydrophilic polymer covalently attached to the surface of the contact lens through one or more covalent linkages each formed between one azlactone moiety at or near the surface of the contact lens and one of the pendant primary or secondary amino groups of the anchoring hydrophilic polymer;
(c) applying a top coating on top of the prime coating to form the hydrophilic coating with an increased surface hydrophilicity and/or durability with respect to the prime coating, wherein the top coating comprises at least one layer of a carboxylic acid-containing hydrophilic polymer and/or at least one layer of an azetidinium-containing polymer, wherein the layer of the carboxylic acid-containing hydrophilic polymer is formed by contacting the contact lens having the prime coating thereon with a solution of the carboxylic acid-containing hydrophilic polymer, wherein the layer of the azetidinium-containing polymer is formed by contacting the contact lens having the prime coating thereon and optionally the layer of the carboxylic acid-containing hydrophilic polymer with a solution of the azetidinium-containing polymer, wherein the layer of the carboxylic acid-containing hydrophilic polymer and/or the layer of the azetidinium-containing polymer is chemically and/or physically bound to the layer of the anchoring hydrophilic polymer,
wherein the top coating comprises at least one layer of a carboxylic acid-containing hydrophilic polymer comprising aldehyde groups and is formed by contacting the contact lens with the prime coating thereon with a solution of a carboxylic acid-containing hydrophilic polymer.

13. The method of claim 12, wherein the azlactone-containing vinylic monomer or macromer is selected from the group consisting of azlactone-containing vinylic monomers include: 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, 2-vinyl-4,4-dimethyl-1,3-oxazolin-6-one, and combinations thereof.

14. The method of claim 13, wherein the azlactone-containing vinylic monomer or macromer is present in an amount of from about 0.6% to about 2.5% by weight in the polymerizable composition.

15. The method of claim 14, wherein the anchoring hydrophilic polymer is selected from the group consisting of a homopolymer of $C_1$-$C_4$ aminoalkyl (meth)acrylamide, a homopolymer of $C_1$-$C_4$ aminoalkyl (meth)acrylate, a copolymer of $C_1$-$C_4$ aminoalkyl (meth)acrylamide with at least one hydrophilic vinylic monomer, a copolymer of $C_1$-$C_4$ aminoalkyl (meth)acrylate with at least one hydrophilic vinylic monomer, polyethyleneimine, polyallylamine hydrochloride homopolymer, polyallylamine hydrochloride copolymer, polyvinylalcohol with pendant primary and/or secondary amino groups, and combinations thereof.

16. The method of claim 15, wherein the carboxylic acid-containing hydrophilic polymer is hyaluronic acid aldehyde.

17. The method of claim 15, comprising a step of applying a final layer of a carboxylic acid-containing hydrophilic polymer or azetidinium-containing polymer onto the contact lens in a lens package which is sealed and autoclave at a temperature of about 115° C. to about 125° C. for a period of from about 15 minutes to about 90 minutes.

18. The method of claim 12, wherein the top coating comprises at least one layer of an azetidinium-containing polymer.

19. The method of claim 18, wherein the top coating comprises at least one bilayer consisting of one layer of one carboxylic acid-containing hydrophilic polymer and one layer of an azetidinium-containing polymer.

20. The method of claim 12, comprising a step of applying a final layer of a carboxylic acid-containing hydrophilic polymer or azetidinium-containing polymer onto the contact lens in a lens package which is sealed and autoclave at a temperature of about 115° C. to about 125° C. for a period of from about 15 minutes to about 90 minutes.

* * * * *